(12) United States Patent
Nakazawa et al.

(10) Patent No.: US 7,107,011 B2
(45) Date of Patent: Sep. 12, 2006

(54) INTERFERENCE MEASUREMENT AND EVALUATION SYSTEM

(75) Inventors: Isao Nakazawa, Kawasaki (JP); Yoshiaki Kobayashi, Tokyo (JP); Ryoichi Shimada, Tokyo (JP); Toshikazu Youkai, Tokyo (JP); Tatsuaki Hamai, Tokyo (JP); Kaoru Murakami, Tokyo (JP); Hiroyo Ogawa, Koganei (JP)

(73) Assignees: Fujitsu Limited, Kawasaki (JP); National Institute of Information and Communications Technology, Tokyo (JP); KDDI Corporation, Tokyo (JP)

( * ) Notice: Subject to any disclaimer, the term of this patent is extended or adjusted under 35 U.S.C. 154(b) by 470 days.

(21) Appl. No.: 10/643,077

(22) Filed: Aug. 19, 2003

(65) Prior Publication Data

US 2004/0171351 A1  Sep. 2, 2004

(30) Foreign Application Priority Data

Feb. 21, 2003 (JP) ............................. 2003-044999

(51) Int. Cl.
H04B 1/10 (2006.01)
H04B 15/00 (2006.01)

(52) U.S. Cl. .................................. 455/63.1; 455/67.13

(58) Field of Classification Search ........ 455/423–425, 455/63.1, 63.2, 67.11, 67.13, 67.7, 560, 561
See application file for complete search history.

(56) References Cited

U.S. PATENT DOCUMENTS

| 6,292,519 B1* | 9/2001 | Popovic ..................... 375/346 |
| 6,646,449 B1* | 11/2003 | Seppinen et al. .......... 324/624 |
| 6,885,694 B1* | 4/2005 | He et al. .................... 375/144 |
| 2005/0032472 A1* | 2/2005 | Jiang et al. ................ 455/13.4 |

* cited by examiner

Primary Examiner—Nguyen T. Vo
(74) Attorney, Agent, or Firm—Staas & Halsey LLP

(57) ABSTRACT

An interference measurement and evaluation system for accurately estimating an interference characteristic of a receiving side including nonlinear interference for a wireless communications system, having a transmission signal for wireless communication and an interference signal between an interfered side and the receiving side, provided with a nonlinear interfering side giving an interference signal having a level unable to be neglected compared with the level of the modulated carrier transmitted from the interfered side, and provided with an interference characteristic estimating means for estimating an interference characteristic including a nonlinear interference characteristic possessed by the receiving side in accordance with a received signal level and a received level when a nonlinear interference theoretical curve given in relation with the line quality satisfies a predetermined line quality.

15 Claims, 15 Drawing Sheets

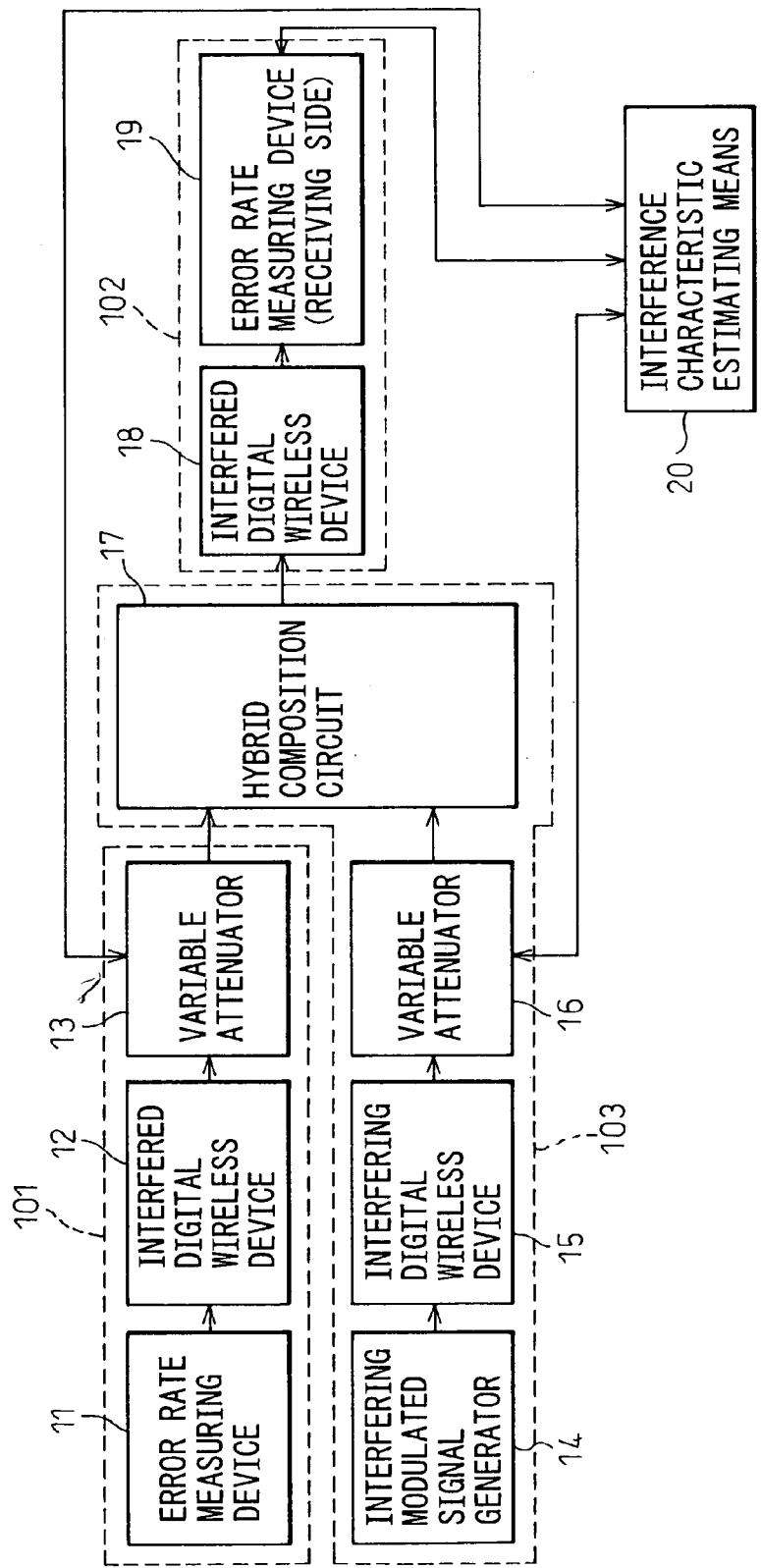

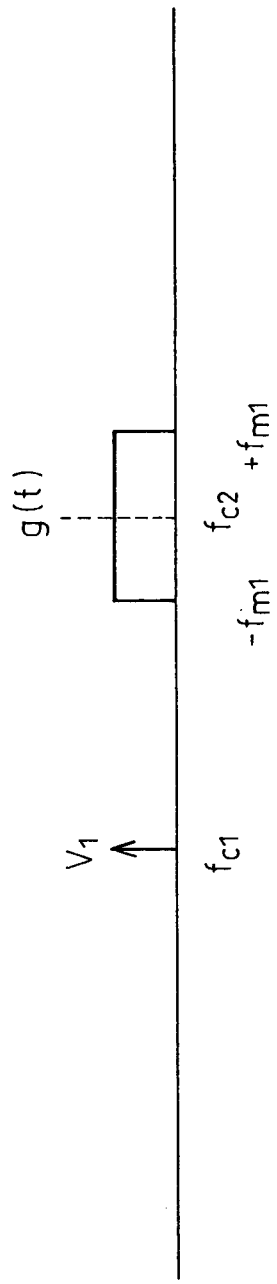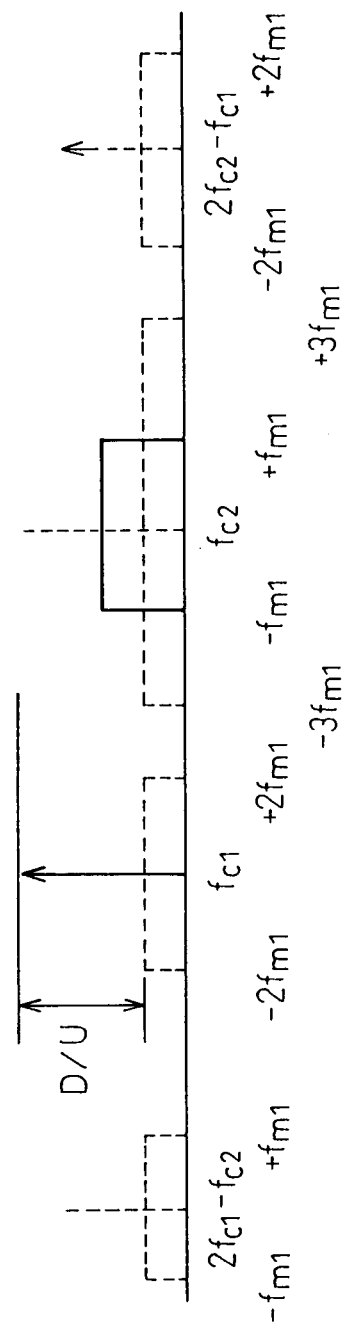

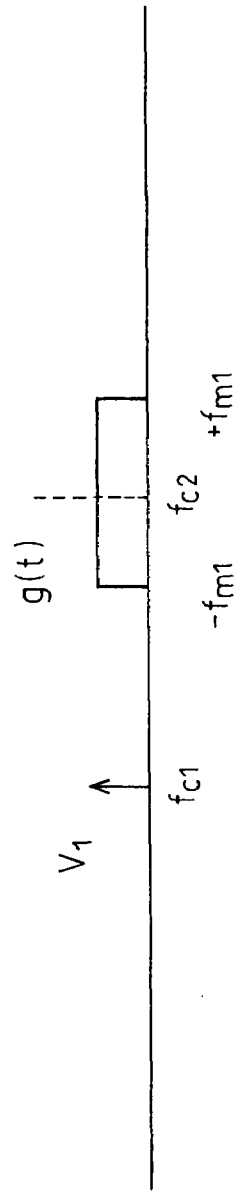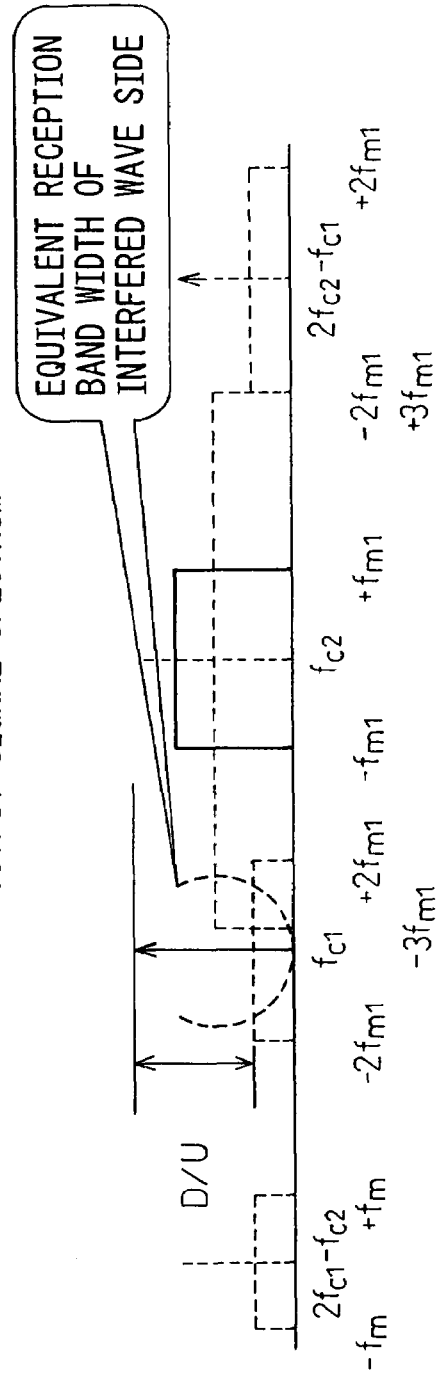

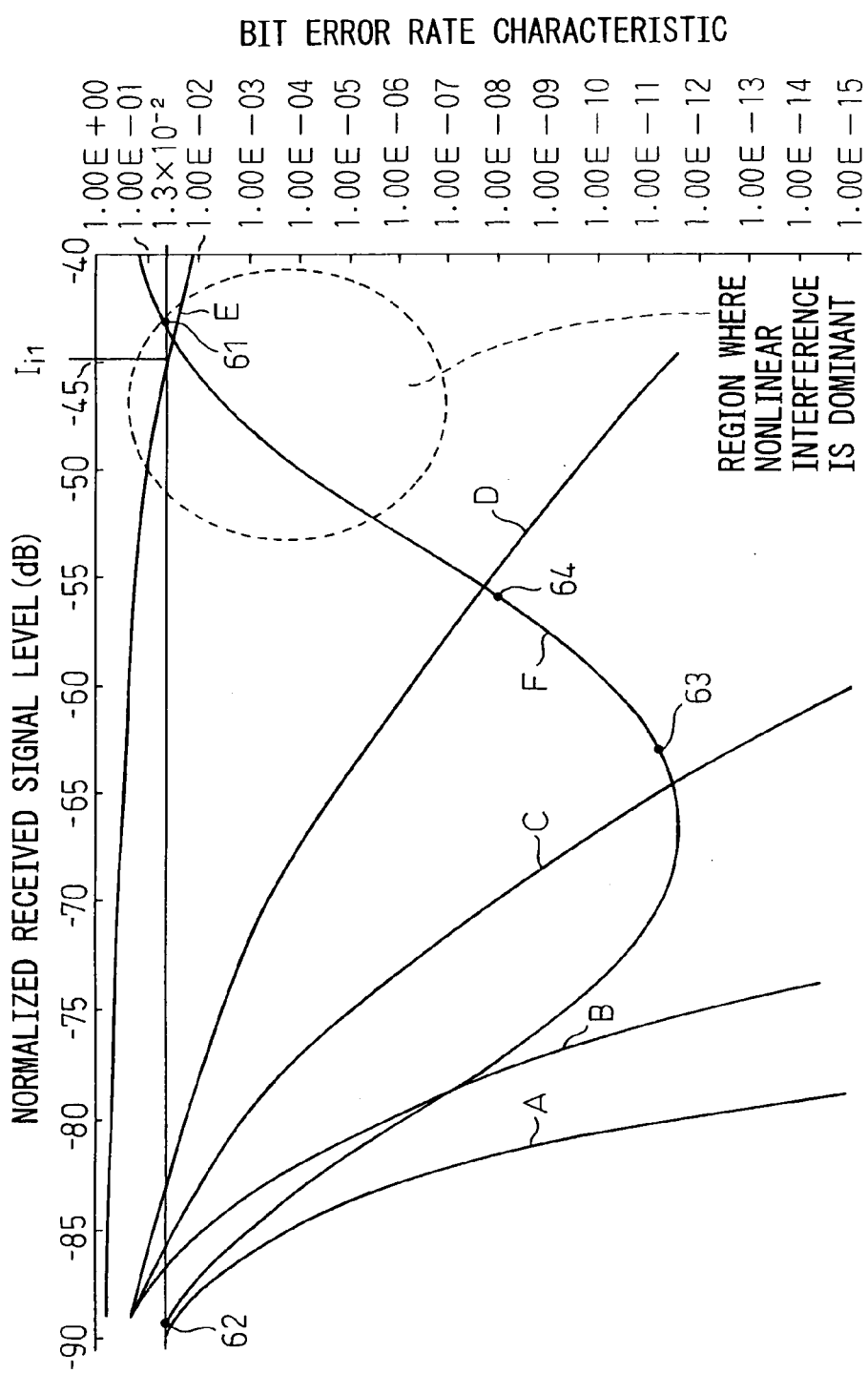

INTERFERENCE MEASUREMENT AND EVALUATION SYSTEM

BACKGROUND OF THE INVENTION

1. Field of the Invention

The present invention relates to an interference measurement and evaluation system, more particularly relates to an interference measurement and evaluation system for estimating a receiving line quality characteristic due to nonlinear interference, reception thermal noise power, leakage power from an adjacent channel, etc. In a communication or broadcasting system using radio waves or optical communications.

2. Description of the Related Art

Wireless communication systems mainly suffer from mutual interference not only between terrestrial mobile wireless systems and terrestrial fixed wireless systems, but also between commercial wireless systems for space and mobile satellite communication systems. These mutual interferences include linear interference due to leakage power from adjacent or next-to-adjacent areas or linear interference due to frequency sharing and nonlinear interference where intermodulation distortion occurs due to high level interference power. In areas where the service area are broad and many systems coexist, the study of nonlinear interference has been becoming important. These are also present in optical communications and broadcasting.

For example, in areas with a coexistence of wireless systems such as conventional mobile wireless communication systems together or a mobile wireless communication system, terrestrial fixed microwave communication system, and mobile satellite communication system, the line quality has been evaluated by the leakage power of the linear parts of interference waves, filtering at the receiving side, the modulation/demodulation scheme, etc., but the nonlinear interference has not been sufficiently evaluated.

Further, while the performance relating to nonlinear interference in a receiver by themselves and individual specifications inside apparatuses of interfered wireless systems have been known, there has never been a means for estimating the above specifications as overall receiver performance in a transmitter and a receiver system.

Nonlinear distortion has been analytically verified in the past. In this, using mathematical algorithms and introducing the third-order intercept point input level (IIP3) technique, the spread of an intermodulation product (IM) spectrum by a modulated wave, the occurrence of an interference wave due to IM, and the sensitivity suppression have been studied (for example, see "Study of Nonlinear Interference Theory Relating to Wide Band Mobile Wireless System and Narrow Band Mobile Wireless System", *Journal of the EIAJ, EIAJ,* RCS2002-140, Aug. 22, 2002, and "Intercept Point and Undesired Responses", *JEEE Transaction on Vehicular Technology*, vol. VT32, no. 1, February 1983).

Summarizing the problems to be solved by the invention, as explained above, in the past, sufficient nonlinear distortion was not taken against nonlinear interference, so there was the problem that it was not possible to analyze the cases of occurrence of nonlinear distortion due to nonlinearity of a receiver and power of the interfering wave, the frequency interval between the desired wave and interference wave, etc., so as to reduce the frequency of occurrence and deterioration of quality in the service area.

SUMMARY OF THE INVENTION

An object of the present invention is to provide an interference measurement and evaluation means for accurately estimating an interference characteristic of a receiving side including nonlinear interference for a communication or broadcasting system using radio waves or optical communication Another object of the present invention is to provide an interference measurement and evaluation system enabling analysis of the frequency of occurrence of nonlinear interference for a wireless communication system.

Still another object of the present invention is to provide an interference measurement and evaluation system using a nonlinear interference theoretical curve linked with a reception line quality characteristic for estimation of a reception characteristic under nonlinear interference, estimation of reception thermal noise power, estimation of the ratio between a third-order distortion coefficient $a_3$ and first-order coefficient $a_1$ due to nonlinear interference or third-order intermodulation (TTP3), or estimation of leakage power from an adjacent channel etc.

To attain the above object, according to the present invention, there is provided an interference measurement, and evaluation system comprised of a transmitting means for transmitting a digitally modulated signal from a modulated wave signal received from the transmitting means, and an interference characteristic estimating means for estimating an interference characteristic including a nonlinear interference characteristic by which the received modulated wave signal is affected from an interference signal for the received modulated wave signal due to the nonlinear characteristic of the receiving means, the interference characteristic estimating means referring to a level of the modulated wave signal received by the receiving means, a level of the interference signal, and a nonlinear interference theoretical curve given in relation to a line quality of a modulated signal decoded by the receiving means and estimating the interference characteristic including the nonlinear characteristic possessed by the receiving means based on the measured level of the modulated wave signal, level of the interference signal, and line quality of the decoded modulated signal.

According to this interference characteristic estimating means, the interference characteristics due to a nonlinear interference wave of a receiving means in a communication or broadcasting system using radio waves or optical wave can be accurately quantized and estimated in advance, so it is possible to accurately estimate specifications from a nonlinear interference theoretical curve as overall performance of reception even when the performance of the reception even when the communication system relating to nonlinear interference and the specifications inside an apparatus of the interfered wireless system are unknown, therefore possible to flexibly estimate the line quality for a wireless communication system under nonlinear interference envisioning a real environment and possible to take measures to prevent deterioration of line quality.

These and other effects are considered the same for an optical communication or broadcasting system etc.

Preferably, the interference characteristic measuring means estimates the nonlinear interference characteristic possessed by the receiving means based on the modulated wave signal of the region where the nonlinear interference is dominant when the nonlinear interference theoretical curve satisfies a predetermined line quality and based on the received level of the interference signal.

Since it is possible to accurately estimate an interference characteristic including nonlinear interference possessed by the receiving means, it is possible to prevent deterioration of the line quality in wireless communication under nonlinear interference.

More preferably, the receiving means is provided with a receiving side interfered digital wireless means receiving a composite signal of a modulated wave signal from the transmitting means and an interference signal from the nonlinear interfering means and an error rate measuring means for measuring an error rate in the composite signal, and the predetermined line quality is a bit error rate free from an effect of leakage power, dominated by the nonlinear interference region, and measured by the error rate measuring means.

Since it is possible to accurately estimate the bit error rate possessed by the receiving means, it is possible to prevent deterioration of the bit error rate in wireless communication under nonlinear interference condition.

More preferably, the transmitting means is provided with a transmitting side variable attenuating means for changing the transmitted signal level and the nonlinear interference characteristic possessed by the receiving means is estimated by changing the transmitted signal level by the transmitting side variable attenuating means.

Due to this, the received signal level changes in accordance with a change in the transmitted signal level, the received level when the nonlinear interference theoretical curve relating to the change satisfies a predetermined line quality, and as a result the nonlinear interference characteristic can be accurately estimated, so the detrimental effect of nonlinear interference on the receiving side can be accurately prevented.

More preferably, the transmitting means and the receiving means are provided between them with a nonlinear interfering means having a carrier frequency different from a frequency region of the transmitting means and giving a nonlinear interference wave signal having a non negligible level compared with the level of the modulated carrier transmitted from the transmitting means, the transmitting means is provided with a transmitting side variable attenuating means for changing the interference signal level, and the nonlinear interfering means is provided with an interfering side variable attenuating means for changing the level of the interference signal, and the transmitting side variable attenuating means and the interfering side variable attenuating means are adjusted to make the ratio of the transmitting signal level and the level of the interference signal constant and give it to the receiving side interfered digital wireless means, whereby the nonlinear characteristic possessed by the receiving means is estimated.

Since the received level is estimated when the nonlinear interference theoretical curve, that relates to a change in the received signal level when the ratio between the transmitted signal level and the level of the interference signal is constant, satisfies a predetermined line quality. As a result, the nonlinear interference can be accurately estimated, and the detrimental effect of nonlinear interference on the receiving side can be accurately prevented.

More preferably, the receiving means is provided with a receiving side variable attenuator for changing an input signal level from the transmitting means and changes the input signal level so as to estimate the nonlinear interference characteristic possessed by the receiving means.

Due to this, it is possible to estimate the nonlinear interference characteristic at any received signal level.

Still more preferably, the interference characteristic estimating means estimates a thermal noise power based on the nonlinear characteristic given to the receiving means based on the received signal level of the region where the received thermal noise power is dominant when the nonlinear interference theoretical curve satisfies a predetermined line quality.

Since the thermal noise power based on the nonlinear characteristic given to the receiving means can be accurately estimated, the minimum received level given by the thermal noise on the receiving side is accurately determined without nonlinear interference.

More preferably, the nonlinear interfering means is provided with a frequency converting means for converting a center frequency of a nonlinear interference wave, and the interference characteristic estimating means estimates a received equivalent band limitation characteristic possessed by the receiving means when converting the center frequency of the nonlinear interference wave by the frequency converting means.

Since the received equivalent band limitation characteristic possessed by the receiving means can be estimated, it becomes possible to suitably set the band limitation characteristic of the receiving means.

Still more preferably, the interference characteristic estimating means estimates a leakage power of the receiving means based on a received signal level of a region where a leakage power is dominant when the nonlinear interference theoretical curve satisfies a best line quality.

Since it is possible to estimate the leakage power of the receiving means under nonlinear interference, measures can be taken to reduce the leakage power.

Still more preferably, the interference characteristic measuring means is provided with a frequency converting means for converting a center frequency of an interference signal, and the interference characteristic estimating means finds a receiving side input level giving the best line quality characteristic and its line quality based on a receiving side input level receiving line quality characteristic of the modulated wave signal for an offset frequency of the interference signal when converting the center frequency of the interference signal by the frequency converting means and the nonlinear interference theoretical curve and estimating the received equivalent leakage power for the offset frequency of the receiving side as a whole using this.

Since it is possible to estimate the leakage power of the receiving means even when the frequency of the interference signal changes, measures can be taken to reduce the leakage power.

Still more preferably, when measured values of a receiving side input level and a received line quality characteristic linked with the nonlinear interference theoretical curve are discrete, the means finds by approximation the receiving side input level giving the best line quality characteristic and that received line quality and estimates the received equivalent leakage power with respect to the offset frequency of the receiving means by this.

Since it is possible to estimate the leakage power of the receiving means in accordance with a change in the center frequency of the interference signal even if the measured values are discrete, measures can be taken to reduce the leakage power.

More preferably, the interference characteristic estimating means estimates the line quality characteristic of the receiving means with respect to an interference signal including a nonlinear interference wave of any frequency and of any level based on the nonlinear interference theoretical curve, a thermal noise power estimated given to the receiving means based on a received signal level of a region where the received thermal noise power is dominant when the nonlinear interference theoretical curve satisfies a predetermined line quality, and the equivalent leakage power.

Since it is possible to estimate the line quality characteristic of the receiving means for an interference signal of any frequency and of any level, it is possible to take measures to prevent deterioration of the line quality of the receiving means due to an interference signal.

Preferably, the interference characteristic estimating means estimates by approximation an interference characteristic including a nonlinear interference characteristic possessed by the receiving means based on a line quality of a decoded signal of a discrete receiving side input level versus modulated wave signal characteristic of a modulated wave signal from a state where there is no signal giving nonlinear interference to the receiving means to a state giving nonlinear interference.

Since the interference characteristic including a nonlinear interference characteristic possessed by the receiving means is estimated by approximation based on the discrete measured values of the received level of the receiving means and the line quality even if there is no signal giving nonlinear interference to the receiving means, the limitation on the frequency of the interference signal is eased and estimation of the interference characteristic becomes easy.

Preferably, the interference characteristic estimating means estimates the nonlinear interference of the receiving means based on a region where an adjacent power dominates and a received level of a region where the received thermal noise dominates in the nonlinear interference theoretical curve.

Since it is possible to estimate a nonlinear interference characteristic of the receiving means even without measuring the received level at a region where the interference power is dominant, estimation of the nonlinear interference characteristic becomes easy.

More preferably, the interference characteristic estimating means estimates the nonlinear interference characteristic of the receiving means based on the nonlinear interference theoretical curve and the estimated thermal noise power even when the modulated wave signal and the interference signal approach each other in frequency to an extent where the adjacent power increases.

Since it is possible to estimate the nonlinear interference characteristic of the receiving means even when the modulated wave signal and the interference signal are close in frequency, estimation of the nonlinear interference characteristic becomes easy.

Summarizing the above, in the present invention, the nonlinear interference is expressed as the nonlinear characteristic of the interfered reception system by $a_3/a_1$ or the intercept point input level (IIP), the third-order distortion of the receiving characteristic is linked with the bit error rate (BER) as one example of the line quality from the interference leakage power from $a_3/a_1$ or the intercept point input level IIP3 and the reception system thermal noise, estimation of the $a_3/a_1$ or the intercept point input level IIP3 of reception as a whole, which was difficult to quantize in the past, is made possible, provision is made of a means for more accurately providing the line quality under nonlinear interference from the estimated $a_3/a_1$ or IIP3, and a good line quality is made possible, The above explanation was mainly mad regarding a wireless communication system, but the invention can also clearly be similarly applied to a communication system or broadcasting system using light.

BRIEF DESCRIPTION OF THE DRAWINGS

These and other objects and features of the present invention will become clearer from the following description of the preferred embodiments given with reference to the attached drawings, wherein:

FIG. 1 is a block diagram of the configuration of an interference measurement and evaluation system according to a first embodiment of the present invention, FIG. 2A is a view of an example of a spectrum of an input signal (modulated wave signal) input to a receiving means, while FIG. 2B is a view of the spectrum of an output signal output from the receiving means in response to the input signal shown in FIG. 2A, FIG. 5A is a view of an example of the spectrum of an input signal (modulated wave signal) input to a receiving means, while FIG. 5B is a view of the spectrum of an output signal for explaining an increase in adjacent leakage power due to an interference wave intermodulation product output from a receiving means in response to the input signal shown in FIG. 5A, FIG. 6 is a graph of an example of a bit error rate characteristic as an example of a line quality characteristic under nonlinear interference measured by using the interference measurement and evaluation system shown in FIG. 1 as a test system.

DESCRIPTION OF THE PREFERRED EMBODIMENTS

Figure 3:
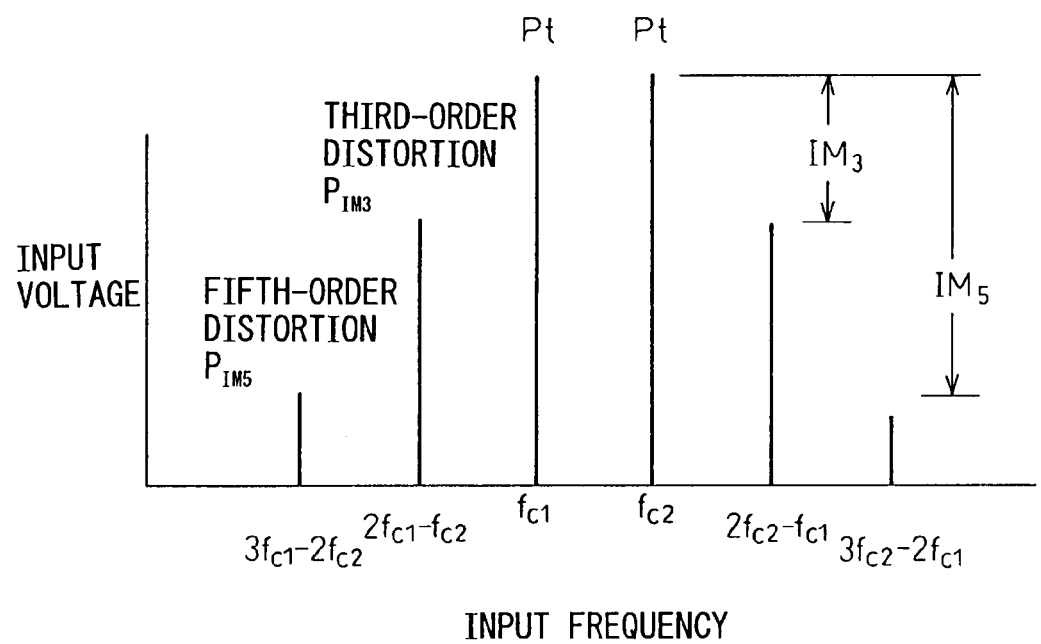
FIG. 3 is a graph for explaining the levels of a main signal, third-order distortion signal, and fifth-order distortion signal when the receiving side receives as input two signals of the same level close in frequency.

Preferred embodiments of the present invention will be described in detail below while referring to the attached figures. Note that in the following explanation, the same reference numerals indicate the same elements.

First Embodiment

FIG. 1 is a block diagram of the configuration of an interference measurement and evaluation system according to a first embodiment of the present invention. In the figure, 11 is an error rate measuring equipment (transmitting side), 12 is an interfered digital wireless equipment (transmitting side), 13 is a variable attenuator for controlling the transmission output level of the interfered digital wireless equipment 12, 14 is a signal generator for generating a modulated signal of an interfered digital wireless equipment, 15 is an interfered digital wireless equipment (transmitting side), 16 is a variable attenuator for controlling the transmission output level of an interfered digital wireless equipment, 17 is a hybrid composition circuit for combining a modulated wave signal output which is output from the interfered digital wireless equipment 12 and passes through the variable attenuator 3 and a modulated wave signal output which is output from the interfered digital wireless equipment 15 and passes through the variable attenuator 16, 18 is an interfered digital wireless equipment (receiving side), 19 is an error rate measuring equipment (receiving side), and 20 is an interference characteristic estimating means including a nonlinear interference characteristic provided according to an embodiment of the present invention.

The error rate measuring equipment 11, interfered digital wireless equipment 12, and variable attenuator 13 constitute a transmitting means 101. The interfered digital wireless equipment 18 and the error rate measuring equipment 19 constitute a receiving means 102. The interfered modulated signal generator 14, interfered digital wireless equipment 15, variable attenuator 16, and hybrid composition circuit 17 constitute a nonlinear interfering means 103.

The interference characteristic estimating means 20 may be realized by any control device such as a microprocessor.

In the present embodiment, the interference measurement and evaluation system is configured as an error rate characteristic test system having a variable attenuator 13 (transmitting side variable attenuating means) for making the power of the interference wave constant and changing the input level of a modulated wave 102 and measuring the error rate of a wireless communication line under interference. The interference characteristic estimating means 20 utilizes a nonlinear interference theoretical curve known in advance, establishes correspondence of the receiving side input level of a modulated wave signal and reception bit error rate as an example of line quality as measured values with the above nonlinear interference theoretical curve, and estimates a nonlinear interference characteristic of the receiving side.

Note that the line quality characteristic is not limited to the bit error rate and may also be a frame error rate, block error rate, packet error rate, etc.

FIG. 2A is a view of an example of a spectrum of an input signal (modulated wave signal and interference signal) input to a receiving means 102, while FIG. 2B is a view of the spectrum of an output signal output from the receiving means 102 in response to the input signal shown in FIG. 2A. In the illustrated example, for simplification of the explanation, the frequency of the interfered wave signal in the input signal is the unmodulated $f_{c1}$, and the interference signal is a modulated continuous spectrum having $f_{c2}$ as a center frequency and having a $2f_{m1}$ bandwidth, but the interfered wave signal and the interference signal may also be an unmodulated frequency or have a modulated continuous frequency band.

The output signal spectrum, as shown in FIG. 2B, shows the occurrence of an interference wave having a bandwidth of $\pm 2f_{m1}$ about the basic frequency $f_{c1}$ of the interference wave and the occurrence of an interference wave having a bandwidth of $\pm 2f_{m1}$ about the frequency $f_{c1}$ of the side band wave of the interference wave. FIG. 2D shows the interference bandwidth $\pm 3f_{m1}$ due to the interfered wave signal centered about the center frequency $f_{c2}$ of the interference signal.

The radio D/U between the output level D (desired) of the basic frequency of an output signal at the basic frequency and an output level U (Undesired) express the degree of interference distortion. The smaller the D/U ratio, the larger the interference distortion. The present invention provides an interference evaluation system for estimating the nonlinear interference at this D/U ratio.

FIG. 3 is a graph for explaining the levels of a main signal, a third-order distortion signal, and a fifth order distortion signal in the case of receiving as input at a receiving side two signals of the same level with close frequencies. In FIG. 3, when the two basic signals ($P_t$) of the close frequencies $f_{a1}$ and $f_{a2}$ are input, third-order distortion of a level $P_{IM3}$ is caused by frequencies of $2_{a2}-f_{a1}$ and $2f_{a1}-f_{a2}$ and fifth-order distortion of a level $P_{IM5}$ is caused by frequencies of $3f_{a2}-2f_{a1}$ and $3f_{a1}-2f_{a2}$.

Figure 4:
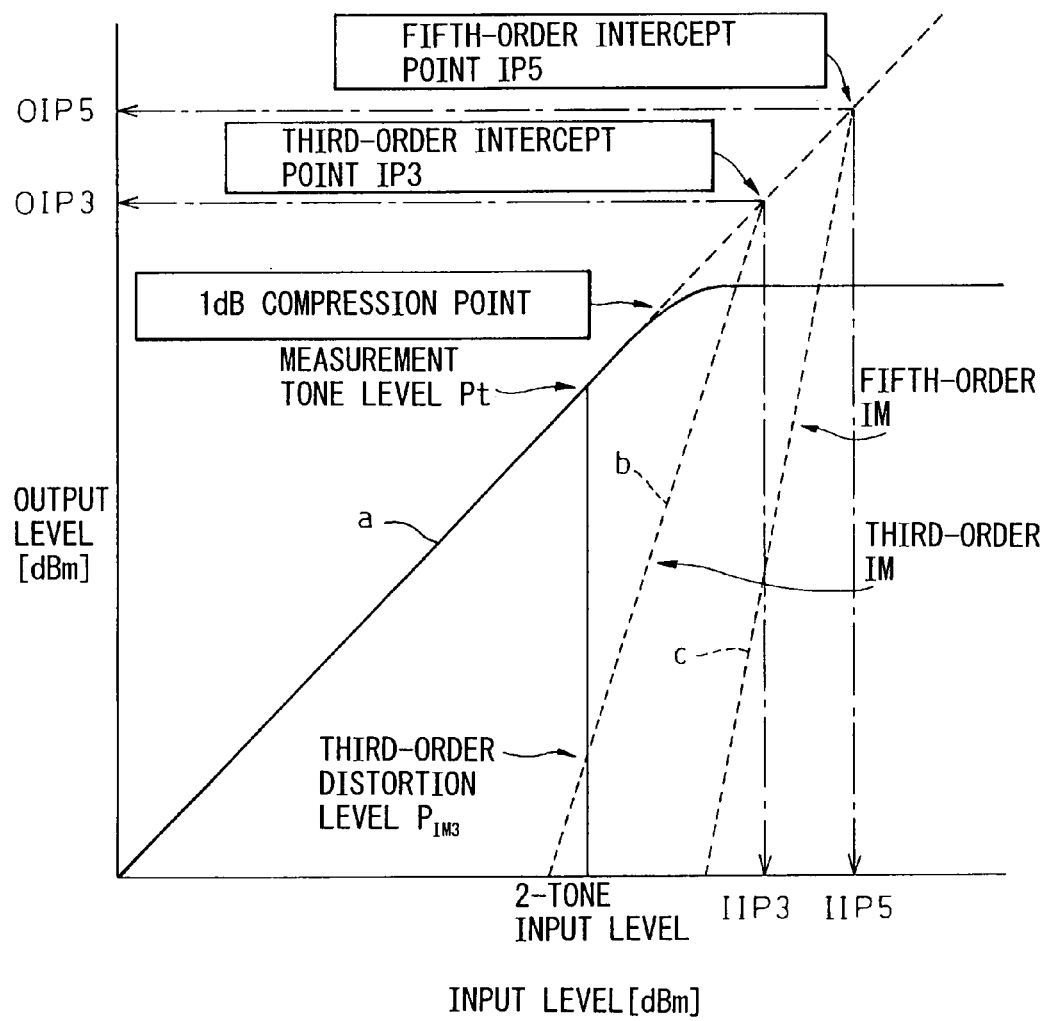
FIG. 4 is a graph for estimating an intercept point from the relationship between an input level and output level at the receiving side.

FIG. 4 is a graph for estimating an intercept point from a relationship of the input level and output level at a receiving side. In FIG. 4, the line "a" shows the relationship between the input levels and output levels of the two basic signals, the line "b" shows the relationship between of the output level of the third-order distortion IM (intermodulation) with respect to the input level of the basic signal, and the line "c" shows the relationship of the output level of the fifth-order distortion IM (intermodulation) with respect to the input level of the basic signal. If the levels of the two basic signals are simultaneously raised, the difference $IM_3$ (see FIG. 3) between the level $P_t$ of the basic signal and the level $P_{IM3}$ of the third-order distortion signal will gradually become smaller. The output of the receiving side in an actual wireless communication system becomes saturated as shown by the solid line in the figure, but if assuming that the output level increases linearly in proportion to the input level, the line "b" showing the third-order distortion will intersect with the part shown by the broken line of the basic signal. The output level at the intersection point is called the "third-order intercept point output level", while the input level is called the "third-order intercept point input level". The present invention estimates this third-order intercept output level or third-order intercept input level by the interference characteristic estimating means 20.

This estimating technique will be explained below.

If expressing the baseband of an interference signal of an interfering means 103 (hereinafter called the "interfering side") by g(L), designating the in-phase component by I(t), designating the orthogonal component by Q(t), and designating the carrier of the mobile wireless equipment of the transmitting means 101 (hereinafter called the "interfered side") the unmodulated wave of the frequency $f_{a1}$ as shown in FIG. 2, the input signal to the receiving means 102 (receiving side) is expressed by equation B(1):

$$x(t)=V_1\cdot\cos(2\pi t_{c2}t)+I(t)\times\cos(2\pi t_{c2}t)+Q(t)\times\sin(2\pi f_{c2}t) \qquad (1)$$

where, $V_1$: carrier voltage of mobile wireless equipment of interfered side $f_{c1}$: carrier frequency of mobile wireless equipment of interfered side $I(t)$: modulated signal voltage of in-phase component of baseband of mobile wireless equipment of interfering side $Q(t)$: modulated signal voltage of orthogonal component of baseband of mobile wireless equipment of interfering side $f_{c2}$: carrier frequency of mobile wireless equipment of interfering side Further, it setting $g(t) = \{I(t)^2 + O(t)^2\}^{1/2}$ and $\theta(t) = \arctan\{Q(t)/I(t)\}$, this is converted to the following equation (2):

$$x(L) = V_1 \cos(2\pi f_{c1} t) + g(t) \times \cos(2\pi f_{c2} t + 0(t)) \quad (2)$$

Here, $g(t)$: modulated signal composite voltage of baseband of mobile wireless equipment of interfering side $\theta(t)$: phase of carrier frequency of mobile wireless equipment of interfering side Further, if expressing $g(t)$ by the spectrum component, this becomes the following equation (3):

$$g(t) = \Sigma V_2(k) \times \cos(k \cdot 2\pi \Delta f_m \cdot t + \Delta \theta_k) \quad (3)$$

$[1 < k < n]$

Here, $V_2(k)$: k-th modulated signal voltage of baseband of mobile wireless equipment of interfering side $\Delta f_m$: modulated frequency interval of baseband of interfering side $\Delta \theta_k$: phase of modulated frequency of mobile wireless equipment of interfering side $Fm = n \times \Delta f_m$: maximum modulated frequency of mobile wireless equipment of interfering side If expressing the input signal of the receiving side amplifier as $x(t)$ and the output signal as $y(t)$ and expressing the nonlinear characteristic by power series expansion, the following equation (4) is obtained:

$$y(t) = a_1 x(t) + a_2 x(t)^2 - a_3 x(t)^3 \quad (4)$$

Here, $a_1, a_2, a_3 \ldots$ are coefficient of power series expansion, and the sign of the third-order coefficient $a_3$ is made a minus sign from the saturation characteristic of the amplifier.

When $f_{c2} - f_{c1} > 3f_m$ by the frequency array shown in FIG. 2, the nonlinear interference of a narrow band mobile wireless equipment expressed by the unmodulated wave (frequency $f_{c1}$) is expressed by the sensitivity suppression of the output signal of the receiving side of the frequency $f_{o2}$, the power ratio ($C/I_3$) of the power C of the frequency $f_{o1}$ at the output signal of the receiving side of the power $I_3$ of the third-order nonlinear intermodulation component (maximum modulation frequency $2f_m$) of the modulated signal of the broad band mobile wireless equipment relating to the frequency $f_{c1}$, etc. Therefore, the sensitivity suppression and the power ratio are estimated as follows:

(1) Estimation of Sensitivity Suppression of input Signal of Receiving Side

If expressing the sensitivity suppression $\eta$ due to nonlinear interference in dB and entering equation (2) into equation (4), the unmodulated wave (frequency $f_{c1}$) component $y_{tc1}$ is expressed by the following equation (5):

$$y_{fc1} = a_1 V_1 \cos(2\pi f_{c1} t) - a_3 V_1^3/2 \cdot \cos(2\pi f_{c1} t) - a_3 V_1 \cdot 3/2 \cdot \cos(2\pi f_{c1} t) \times g(t)^2 \quad (5)$$

If designating the power of the interfering wave side as $P_2$, $P_2$ is expressed by the following equation (6):

$$P_2 = \int_0^T g(t)^2 \times \cos^2(2\pi f_{c2} t)/(T \cdot R) dt \quad (6)$$

where, T is the integrated time interval, $g(L)$ is expressed by equation (3), and, when $V_2 = V_2(k)$, $P_2 = 1/2 \cdot V_2^3/2/R$.

Here, R is the input impedance of the receiving side.

The relationship between the ratio $a_3/a_1$ of the coefficients $a_3$ and $a_1$ in equation (4) and the input third-order intercept point IIP3 is known in advance and may be expressed as follows:

$$a_3/a_1 = 1/(3/2 \cdot R \cdot IIP3)$$

If designating the input impedance of the receiving side as R and normalizing the input powers $V_1$ and $V_2$ of the receiving side of the frequencies of $f_{c1}$ and $f_{c2}$ by the input third-order intercept point IIP3, the powers $I_{i1}$ and $I_{i2}$ become as follows:

$$I_{i1} = V_1^2/2/R/(IIP3)$$

$$I_{i2} = 1/2 \cdot V_2^2/2/R/(IIP3)$$

The sensitivity suppression is expressed by the following equation (7):

$$\eta - 20 \times \log |1 - I_{i1} - 2 \cdot I_{i2}| \quad (7)$$

The sensitivity suppression $\eta$ at the input signal of the receiving side for finding the nonlinear interference can be estimated based on the third-order input intercept point IIP3 found from the received power (received signal level) and nonlinear interference theoretical curve.

In place of the IIP3, it is also possible to use the third-order output intercept point OIP3. Further, if it is possible to find the coefficient ratio $a_3/a_1$ by another technique, that may be used as well.

(2) Estimation of Power Ratio ($C/I_3$) Between Power C of Carrier $f_{c1}$ at Output Signal of Receiving Side and Power of Nonlinear Third-Order Interference Wave Relating to That Carrier $f_{c1}$.

The double modulated wave component of the $f_{c1}$ component of the output signal of the receiving side is expressed by the following equation (8) from the third term of equation (5):

$$y_{c1-IM} = -a_3 V_1 \cdot 3/2 \cdot \cos(2\pi f_{c1} t) \times g(t)^2 \quad (8)$$

If using the value $I_{i2}$ obtained by normalizing the total power of the frequency $f_{c2}$ by the input third-order intercept point IIP3, the power ratio ($C/I_3$) of the power C of the carrier $f_{c1}$ at the output signal of the receiving side and the third-order power related to this carrier $f_{c1}$ becomes the following equation (9):

$$C/I_3 = -10 \log(Iin^2) + A \quad (9)$$

Here, A is a constant determined by the frequency spectrum distribution of the interference wave frequency $f_{c2}$, maximum modulation frequency, and equivalent reception band width (BW) of the frequency $f_{c1}$.

When the frequency spectrum distribution of the interference frequency $f_{c2}$ is constant, if entering equation (3) for $g(t)$ in equation (8) and finding the power, the power spectrum component ($P_{c1-m}$) of the interference wave output from the receiving side becomes the following equations (10) to (12):

$$P_{c1-m} = (-a_3 3/2)^2 \cdot (P_{C1}) \cdot (2R \cdot Pin/F_m)^2 \times |f_m|/2)$$
$$-F_m \leq f_m < 0 | 0 \leq f_m \leq F_m \quad (10)$$

$$+(-a_3 3/2)^2 \cdot (P_{C1}) \cdot (2R \cdot Pin/F_m)^2 \times (F_m - |f_m|/2)$$
$$2F_m \leq f_m < F_m | F_m < f_m \leq 2F_m \quad (11)$$

$$+(-a_3 3/2)^3 \times (P_{C1}) \times (2R \times Pin/F_m)^2 \times (F_m - |f_m|)$$
$$-F_m \leq f_m < 0 | 0 \leq f_m \leq F_m \quad (12)$$

If making the reception pass band BW of the interfered wave frequency $f_{c1}$ much less than Fm, from the power spectrum $P_{c1-m}$ expressed by equation (10) to (12), the power ($P_{BW}$) of the interference wave in the range of $f_{c1}-BW/2 < fm < f_{c1}+BW/2$ is obtained by integrating equation (10) to equation (12).

Normalizing the powers of the frequencies $f_{c1}$ and $f_{c2}$ by the input third-order intercept point IIP3 and applying $$a_3/a_1 - 1/(3/2 \cdot R \cdot IIP3)$$

$$I_{11} = V_1^2/2/R/(IIP3)$$

$$I_{12} = 1/2 \cdot V_2^2/2/R/(IIP3)$$

to $P_{BW}$, the power $I_2$ of the interference wave output from the receiving side is estimated by the following equation (13):

$$I_3 = 2(-a_1/IIP3)^2 \cdot (P_{C1}) \cdot (2 \cdot Pin/F_m)^2 \times (F_m \times DW/2 - DW^2/16) \quad (13)$$

The ratio (C/$I_3$) of the power C, where C=$(a_1 \times V_1)^2/3/R$, of the basic component of $f_{c1}$ with $I_3$ expressed by equation (13) becomes:

$$C/I_3 = -10 \times \log [8 \times Iin^2 \times \{BW/F_m/2 - (BW/F_m)^2/16\}] \quad (14)$$

The constant A of equation (9) is $$A - 10 \times \log [8 \times \{BW/F_m/2 - (BW/F_m)^2/16\}] \quad (15)$$

(3) Estimation of Error Rate Characteristic a) QPSK Delay Detection Type Simplified Error Rate Characteristic is:

$$BER = 1/2 \times \exp(-\rho/2) \quad (16)$$

Here, if the signal to noise power ratio is ρ, $$\rho = A^2/2/50/\sigma^2 \quad (17)$$

where, $\sigma^2$: noise power, A: amplitude of carrier, 50: impedance

If the reception power of the frequency $f_{c1}$ is C and the sensitivity suppression is η, ρ becomes the following equation (18):

$$\rho = 1/\{1/(\eta \cdot \delta \cdot C/P_N) + 1/(\eta \cdot \delta \cdot C/I_{ACP}) + 1/(\eta \cdot \delta \cdot C/I_3)\} \quad (18)$$

where, $I_{ACP}$: leakage power affecting interfered wireless communication as calculated from interference wave power and reduction factor (IRF) ($I_{ACP}$=IRF×power $P_2$ of interference wave side).

$C/I_3$ is the power ratio (truth value) of the $f_{c1}$ component expressed by equation (15) and the intermodulation wave component relating to $f_{c1}$.

η is the sensitivity suppression (truth value) factor as calculated from equation (7).

δ is the fixed deterioration of the bit error rate arising due to imperfections in the transmitter/receiver (truth value).

b) QPSK Delay Detection Type Error Rate Characteristic $$BER = Q(a, b) - \frac{1}{2} \times \exp\left[-\frac{a^2 + b^2}{2}\right] I_0(ab) \quad (19)$$

$$\begin{cases} a = \sqrt{2\gamma(1 - 1/\sqrt{2})} \\ b = \sqrt{2\gamma(1 + 1/\sqrt{2})} \end{cases}$$

where,

Q: Marcum O-function $I_0$: 0-th modification Bessel function of the first kind $$\gamma = 1/\{1/(\eta \cdot \delta \cdot E_b/N_0) + 1/(\eta \cdot \delta \cdot Bn \cdot E_b/I_{ACP}) + 1/(\eta \cdot \delta \cdot Bn \cdot E_b/I_3)\} \quad (20)$$

where, $E_b$: energy per pit $N_0$: noise power density $I_{ACP}$: leakage power affecting interfered wireless communication as calculated from interference wave power and reduction factor (IRF) ($I_{ACP}$=IRF×power $P_2$ of interference wave side)

$$Bn \cdot E_b/I_3 - \frac{C}{I_3} \cdot \frac{Bn}{k} \cdot Bn \cdot T \quad (21)$$

$C/I_3$ is the power ratio (truth value) of the $f_{c1}$ component expressed by equation (14) and the intermodulation wave component relating to $f_{c1}$ component.

Bn: reception equivalent noise band width of interfered wireless communication

T: time length with respect to symbol period k: amount of information (bits) per symbol η: sensitivity suppression (truth value) factor as calculated from equation (7)

δ is the fixed deterioration of the bit error rate arising due to imperfections of the transmitter/receiver (truth value)

c) QPSK Absolute Synchronous Detection Error Rate Characteristic $$BER - 1/2 \times \text{erfc } \sqrt{\gamma} \quad (22)$$

where, $$\gamma = 1/\{1/(\eta \cdot \delta \cdot E_b/N_0) + 1/(\eta \cdot \delta \cdot Bn \cdot E_b/I_{ACP}) + 1/(\eta \cdot \delta \cdot Bn \cdot E_b/I_3)\} \quad (23)$$

Here, $E_b$: energy per bit $N_0$: noise power density $I_{ACP}$: leakage power affecting interfered wireless communication as calculated from interference wave power and reduction factor (IRF) ($I_{ACP}$=IRF×power $P_2$ of interference wave side)

$$Bn \cdot E_b/I_3 = _{I3}C \cdot_k Bn \cdot T \quad (24)$$

$C/I_3$ is the power ratio (truth value) of the $f_{c1}$ component expressed by equation (14) and the intermodulation wave component relating to $f_{c1}$ component.

Bn: reception equivalent noise band width of interfered wireless communication

T: time length with respect to symbol period k: amount of information (bits) per symbol η: sensitivity suppression (truth value) factor as calculated from equation (7)

δ is the fixed deterioration of the bit error rate arising due to imperfections of the transmitter/receiver (truth value)

d) QPSK Differential Synchronous Detection Error Rate Characteristic

This is found as about double the QPSK absolute synchronous detection error rate characteristic.

$$BER = erfc\sqrt{\gamma} \quad (25)$$

Next, the increase in the adjacent leakage power due to the interference wave intermodulation product when the frequency interval of the interference wave and interfered wave is narrow in absolute terms will be explained.

As shown by the broken lines of FIG. 5B, when three times the modulation frequency of the modulated wave at the interfering side is broader than the frequency interval of the interference wave and interfered wave, the interference wave component causes the adjacent leakage power to increase due to the third order distortion of the wireless receiver of the interfered side.

If the ratio of the adjacent leakage power increasing by this intermodulation product with the power of the wireless band of the interference wave is designated as $IRF_3$, it may be expressed as follows:

$$IRF_3 = -10 \times \log [\text{Iin}^2] + B(dB) \quad (26)$$

Here, B is a constant determined by the frequency spectrum distribution of the frequency $f_{c2}$, the maximum modulation frequency, the equivalent reception band width (BW) of the frequency $f_{c1}$, and the frequency interval between the frequency $f_{c1}$ and the frequency $f_{c2}$.

When the frequency spectrum distribution of the interference frequency $f_{c2}$ is constant, if entering equation (2) into equation (4), the component ($Y_{ACP}$) resulting from third-order distortion of the frequency $f_{c2}$ component is $$y_{fc2} = -a_3 \times g(t)^3 \quad (27)$$

If entering equation (3) into equation (27), the frequency $f_{c2}$ component is expressed as follows:

$$y_{fc2} = -a_3 \cdot 6)^{1/2} \cdot \Sigma v_2(l) \cdot \Sigma v_2(m) \cdot \cos(k \cdot 2\pi \Delta f_m \cdot t + \Delta\theta_k) \cdot \cos(l \cdot 2\pi \Delta f_m \cdot t + \Delta\theta_1) \cdot \cos(m \cdot 2\theta \Delta f_m \cdot t + \Delta\theta_m)$$

$$[1 \leq k \leq n-2, k+1 \leq l \leq n-1, l+1 \leq m \leq n]$$

$$\times \cos(2\pi f_{c2} t + \theta(t)) \quad (28)$$

Here, $V_2(k)$: k th modulation signal voltage of baseband of mobile wireless equipment at interfering side $\Delta f_m$: modulation frequency interval of baseband at interfering side $\Delta\theta_k$: phase of k th modulation frequency of mobile wireless equipment of interfering side $\Delta\theta_1$: phase of 1st modulation frequency of mobile wireless equipment of interfering side $\Delta\theta_m$: phase of m-th modulation frequency of mobile wireless equipment of interfering side $Fm = n \times \Delta f_m$: maximum modulation frequency of mobile wireless of interfering side $f_{c2}$: carrier frequency of mobile wireless equipment of interfering side $\theta(t)$: phase of carrier frequency of mobile wireless equipment of interfering side

[V]: range of product-sum

Expressing equation (28) by the A+B+C type, A+B−C type, A−B+C type, and A−B−C type by combination of the modulation frequencies, expressing the composite frequency of the three modulation waves of the K, l, and m components by L, expressing the composite frequency of the two modulated waves of the l and m components by S, and converting the modulation frequencies to L, S, and m in equation (28), the power with respect to $f_L = L \cdot \Delta f_m$ is expressed by the following:

$$P_{fc2}(f_L) = \quad (29)$$

A+B+C TYPE $$+3 \times (-a_3 \cdot 3/4 \cdot 2R)^2 \cdot 2/4 \cdot (Pin/Fm)^3 \cdot 1/12 \cdot f_L^2 \qquad 1$$

$$Fm \leq f_L \leq 0 | 0 < f_L \leq Fm$$

Here, "|" expresses "or" of the left side condition and right side condition. Namely, the above expression means that $-Fm < f_L < 0$ or $0 < f_L < Fm$ is satisfied.

$$+3 \times (-a_3 \cdot 3/4 \cdot 2R)^2 \cdot 2/4 \cdot (Pin/Fm)^3 \cdot 1/6 \cdot 1/8 \cdot (3Fm - |f_L|)^2 \qquad 2$$

$$2Fm \leq f_L < Fm | Fm < f_L \leq 2Fm$$

$$+3 \times (-a_3 \cdot 6/8 \cdot 2R)^2 \cdot 2/4 \cdot (Pin/Fm)^3 \cdot 1/16 \cdot (f_L - Fm) \cdot (^{+/} Fm - 3f_L) \qquad -3$$

$$-2Fm \leq f_L < -Fm | Fm < f_L \leq 2Fm$$

$$+3 \times (-a_3 \cdot 6/8 \cdot 2R)^2 \cdot 2/4 \cdot (Pin/Fm)^3 \cdot 1/3 \cdot 1/16 \cdot (3Fm - f_L)^2 \qquad -4$$

$$-3Fm \leq f_L < -2Fm | 2Fm < f_L \leq 3Fm$$

$$+3 \times (-a_3 \cdot 6/8 \cdot 2R)^2 \cdot 2/4 \cdot (Pin/Fm)^3 \cdot 1/16 \cdot (3Fm\, f_L)^2 \qquad -5$$

$$-3Fm \leq f_L < -2Fm | 2Fm < f_L < 3Fm$$

A+B−C TYPE $$+3 \times (-a_3 \cdot 6/8 \cdot 2R)^2 \cdot 2/4 \cdot (Pin/Fm)^3 \cdot 1/4 (Fm - |f_L|)^2 \qquad -6$$

$$-Fm \leq f_L < 0 | 0 < f_L < Fm$$

$$+3 \times (-a_3 \cdot 6/8 \cdot 2R)^2 \qquad -7$$

$$f_L = O$$

$$+3 \times (-a_3 \cdot 6/8 \cdot 2R)^2 \cdot 2/4 \cdot (Pin/Fm)^3 \cdot 1/4 \cdot (Fm - |f_L|)^2 \qquad -8$$

$$-Fm < f_L < 0 | 0 < f_L < Fm$$

A−B+C TYPE $$3 \times (-a_3 \cdot 6/8 \cdot 2R)^2 \cdot 2/4 \cdot (Pin/Fm)^3 \cdot (Fm - |f_L|) \cdot |f_L| \qquad -9$$

$$-Fm \leq f_L < 0 | 0 < f_L \leq Fm$$

A−B−C TYPE $$+3 \times (-a_3 \cdot 6/8 \cdot 2R)^2 \cdot 2/4 \cdot (Pin/Fm)^3 \cdot 1/4 \cdot (2Fm - |f_L|)^2 \qquad -10$$

$$-2Fm \leq f_L \leq -Fm | (Fm) \leq f_L \leq (2Fm)$$

$$+(-a_3 \cdot 6/8 \cdot 2R)^2 \cdot 2/4 \cdot (Pin/Fm)^3 \cdot 1/4 \cdot f_L^2 \qquad -11$$

$$-Fm < f_L < 0 | 0 < f_L < Fm$$

Applying $a_2/a_1 = 1/(3/2 \cdot \text{IIP3} \cdot R)$ and making the reception pass band of the frequency $f_{c1}$ BW<<Fm, if integrating the power ($P_{BW}$) in the range of the power $P_{fc2}(f_L)$ to $f_{c1} - BW/2 \leq f_m \leq f_{c1} + BW/2$ by equation (29) and dividing the result by the total power of the wireless band of the frequency $f_{c2}$ component to find $IRF_3$, the following is obtained:

$$IRF_3 = 10 \times \log (Iin^2) + 10 \times \log \quad (30)$$

$$+1/4 \times \{f_L^2/Fm^2 + (BW/2)^2/Fm^2\} \cdot (BW/2/Fm) \quad \text{-1}$$

$$\leq O \leq f_L \leq Fm - BW/2$$

$$+1/16 \times (BW/2/Fm) \cdot |(f_L/Fm-3)^2 + 1/3 \cdot (BW/2)^2/Fm^3) \quad \text{-2}$$

$$Fm + BW/2 \leq f_L \leq 2Fm$$

$$+3/16 \times (BW/2/Fm) \cdot \{(7-3f_L/Fm) \cdot (f_L/Fm-1) - (BW/2)^2/Fm^2\} \quad \text{-3}$$

$$Fm + BW/2 \leq f_L \leq 2Fm - BW/2$$

$$+1/16 \times (BW/2/Fm) \cdot \{(3-f_L/Fm)^2 + 1/3 \cdot (BW/2)^2/Fm^2\} \quad \text{-4}$$

$$2Fm + BW/2 < f_L < 3Fm - BW/2$$

$$+3/16 (BW/2/Fm) \cdot \{(3-f_L/Fm)^2 + 1/3 \cdot (BW/2)^2/Fm^2\} \quad \text{-5}$$

$$2Fm + BW/2 \leq f_L \leq 3Fm - BW/2$$

$$+1/24 \times [3 - (f_L/Fm - BW/2/Fm)^2 (f_L/Fm + BW/2/Fm) \cdot \{-2 (f_L Fm + BW/2/Fm)^2 + 9(f_L/Fm + BW/2/Fm) - 9\}]$$

$$Fm - BW/2 < f_L < Fm + BW/2 \quad \text{-6}$$

$$+3/32 \times [(f_L/Fm - BW/2/Fm) \cdot ((f_L/Fm - BW/2/Fm)^2 - 9(f_L/Fm - BW/2/Fm) + 7)$$

$$2Fm - BW2/ < f_L < 2Fm + BW/2/ + (f_L/Fm + BW/2/Fm) \cdot (1/3 (f_L/Fm + BW/2/Fm)^2 - 9 \cdot (f_L/Fm + BW/2/Fm) + 9) - 32/3] \quad \text{-7}$$

$$+1/8 \times [9 - (f_L/Fm - BW/2/Fm) \cdot \{9 \, 3(f_L/Fm \, BW/2/Fm) + 1/3(f_L/Fm - BW/2/Fm)^2\}] \quad \text{-8}$$

$$3Fm - BW/2 < f_L < 3Fm$$

$$+3/2 \times (BW/2/Fm) \cdot [(1 - f_L/Fm)^2 + (BW/2/Fm)^2/3] \quad \text{-9}$$

$$BW/2 < f_L \leq Fm - BW/2$$

$$+3/2 \times [1/3 \cdot (BW/2/Fm) \cdot (3/Fm + (BW/2/Fm)^2 - 3(BW/2/Fm)) + ((BW/2/Fm) - 1) f_L^2/Fm/Fm]$$

$$O \leq f_L < BW/2 \quad \text{-10}$$

$$+3/4 \times [-(f_L/Fm - (BW/2/Fm)) + (f_L/Fm - (BW/2/Fm))^2 + 1/3 - (f_L/Fm - BW/2/Fm)^2/3]$$

$$Fm - BW/2 \leq f_L < Fm + BW/2 \quad \text{-11}$$

$$+3 \times [f_L/Fm(BW/2/Fm) \cdot (f_L/Fm)^2 (BW/2/Fm) 1/3 (BW/2/Fm)^3] \quad \text{-12}$$

$$BW/2 < f_L \leq Fm_L - BW/2$$

$$+3/2 \times \{(BW/2/Fm)^2 + (f_L/Fm)^2 - 2/3(BW/2/Fm)^3 - 2(BW/2Fm)(f_L/Fm)^2\} \quad \text{-13}$$

$$O > f_L < BW/2$$

$$+3/2 \times \{1/16 - 1/3(f_L/Fm - BW/2/Fm)^2 + 1/3(f_L/Fm - BW/2/Fm)^3\} \quad \text{-14}$$

$$Fm - BW/2 < f_L \leq Fm + BW/2$$

$$+3 \times \{1/3(BW/2/Fm)^3 | (f_L/Fm)^2 (BW/2/Fm)\} \quad \text{-15}$$

$$O < f_L < Fm - BW/2$$

$$+3/4 \times \{(2 - f_L/Fm)^2 (BW/2/Fm) + 1/3 (BW/2/Fm)^3\} \quad \text{-16}$$

$$Fm + BW/2 < f_L \leq 2Fm - BW/2$$

$$+3/8 \times [2(f_L/Fm \, BW/2/Fm)^3/3 + (f_L/Fm + BW/2/Fm)$$

$$Fm - BW/2 < f_L < Fm + BW/2 \cdot [4 - 2(f_L/Fm + BW/2/Fm) + (f_L/Fm + BW/2/Fm)^2/3)] \quad 17$$

$$+3/4 \times [4/3 - (f_L/Fm \, BW/2/Fm) \cdot (2 - (f_L/Fm - BW/2/Fm) + 1/6(f_L/Fm - BW/2/Fm)^2)] \quad \text{-18}$$

$$2Fm - BW/2 < f_L \leq 2Fm$$

Here, the frequency $f_{c1}$ and $f_{c2}$ are normalized by the input third-order intercept point IIP3 to obtain:

$$a_3/a_1 = 1/(3/2 \cdot R \cdot IIP3)$$

$$I_{11} = V_1^2/2/R/(IIP3)$$

$$I_{12} = 1/2 \cdot V_2^2/2/R/(IIP3)$$

The dB value of equation (30)–1 to 18 is the constant B of equation (26).

The error rate characteristic is found by making the $IRF_3$ obtained by converting the $IRP_3$ (dB value) expressed by equation (30) to a truth value less than the leakage power value of equations (18), (20), and (23).

$$I_{ACP} = (IRF|IRF_3) \times \text{Power of Interfering Side } P_2$$

Here, BW is the frequency band width of the interference signal, Fm is half of the maximum modulated wave frequency band width of the interference signal, and "|" means "or".

The following action is obtained by the interference measurement and evaluation system according to the present invention explained in brief above:

It is possible to express the correspondence with the BER characteristic from the intercept point input level (IIP), reception thermal noise, and interference leakage power from an adjacent channel as a nonlinear characteristic of the interfered reception system using equations (7) and (14) expressing the signal of the desired wave input for reception of a modulated wave and signal of the interference wave by a discrete or continuous spectrum, equations (16) to (18) expressing the delay detection type simplified error rate characteristic, equations (19) to (21) expressing the QPSK delay detection type error rate characteristic, equations (22) to (25) expressing the QPSK absolute synchronous detection error rate characteristic, or double the bit error rate characteristic of equations (22) to (25) for the error rate characteristics of the QPSK differential synchronous detection error rate characteristic. Therefore, it is possible to enable estimation of the IIP3 of the reception as a whole and to more precisely and flexibly provide line qualities under nonlinear interference from the estimated IIP3.

FIG. 6 is a graph of an example of the bit error rate characteristic as an example of a line quality characteristic under nonlinear interference measured using the interference measurement and evaluation system shown in FIG. 1 as a test system. In FIG. 6, the curve A is the bit error rate characteristic when there is no interference, and the curves B to E show the bit error rate characteristic under nonlinear interference when gradually increasing and measuring the interference wave power. The points 61 to 64 are points of the received signal level versus bit error rate characteristic of the modulated wave signal when converting the ratio D/U of the power D of the desired wave (interfered side) and the power U of the interference wave to a constant one. The curve F shown the bit error rate characteristic under nonlinear interference when making constant the D/U estimated by connecting the points 61 and 64.

To change the level of the received signal while making D/U constant, either only the transmitting side variable attenuator 13 is controlled or both the transmitting side variable attenuator 13 and interference side variable attenuator 16 are controlled. This control may be performed by the interference characteristic estimating means 20 or may be performed by other means.

In this embodiment, the points 61 and 62 are points where the bit error rate satisfies $1.3 \times 10^{-1}$ as an example. The bit error rate employed may be any error rate so long as it is in a region where the nonlinear interference is dominant. Note that the gradations 1.00E+00, 1.00E−01, 1.00E−2, . . . of the ordinate showing the bit error rate mean $1 \times 10^{0}$, $1 \times 10^{-1}$, $1 \times 10^{-2}$ . . . The lower in the figure, the lower the error rate. Further, the unit of the level of the normalized received signal of the abscissa is the decibel (dB). The further to the left in the figure, the lower the received level.

Here, the intercept point input level IIP3 of the receiving side as a whole in interfered wireless communication can be estimated from the following equation (32) from the normalized received signal level $I_{11}$ at $1.3 \times 10^{-2}$ as an example of the bit error rate at the received level region near the point 61 where the nonlinear interference is dominant and the measured value $P_{c1}$ at the bit error rate $1.3 \times 10^{-2}$.

$$IIP3 = P_{r1}/I_{i1} \qquad (32)$$

However, the following conditions must be satisfied:

1) The bit error rate $1.3 \times 10^{-2}$ near the line connecting the points 61 and 62 be a region where there is no effect from the received noise power, there is a level difference, and nonlinear interference is dominant.

2) The bit error rate $1.3 \times 10^{-2}$ near the line connecting the points 61 and 62 be a region where there is no effect of the leakage power from the interference wave, the error rate of the curve B is sufficiently low, and nonlinear interference is dominant.

Second Embodiment

Figure 7:
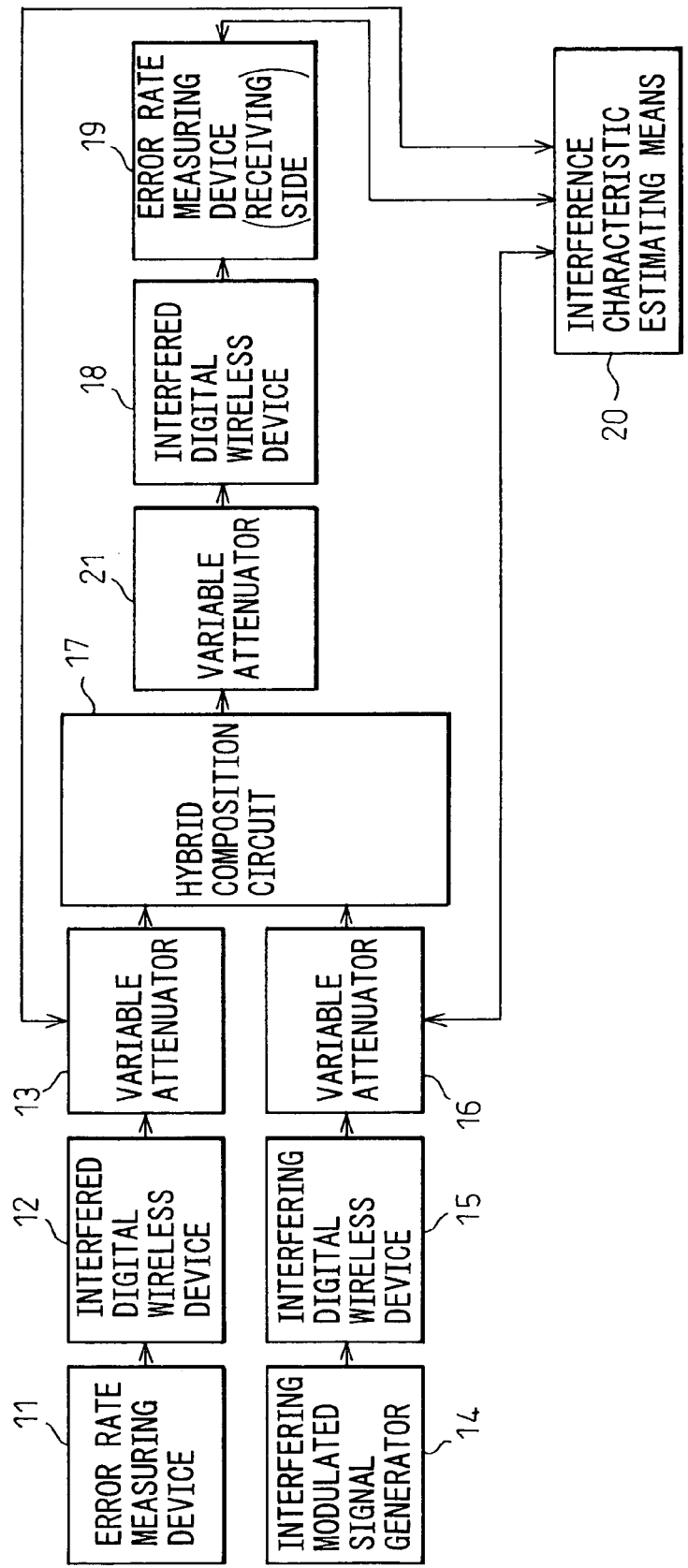
FIG. 7 is a block diagram of the configuration of an interference measurement and evaluation system according to a second embodiment of the present invention.

FIG. 7 is a block diagram of the configuration of an interference measurement and evaluation system according to a second embodiment of the present invention. In the figure, the difference from FIG. 1 is that the receiving side variable attenuator 21 is connected between the hybrid composition circuit 17 and the interfered digital wireless equipment 18 in the receiving means.

In this embodiment, by adjusting the receiving side variable attenuator 21, the received level of the interfered digital wireless equipment 18 is controlled while making constant the ratio D/U of the modulated wave signal output input to the interfered digital wireless equipment 18 and the modulated carrier signal output from the interfering digital wireless equipment 15.

Figure 8:
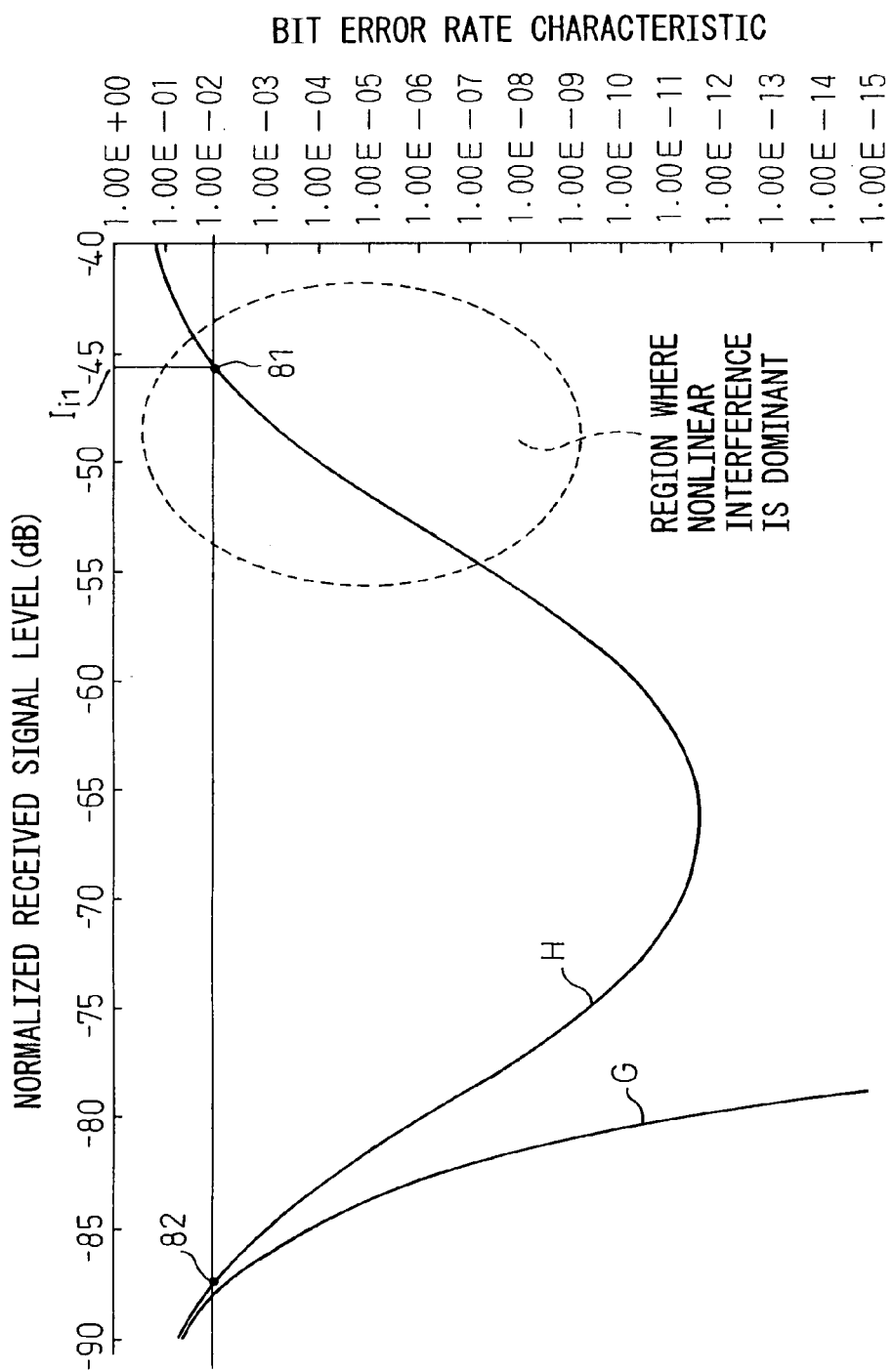
FIG. 8 is a graph of an example of the bit error rate characteristic under nonlinear interference measured by using the test system shown in FIG. 7.

FIG. 8 is a graph of an example of the bit error rate characteristic under nonlinear interference measured using the test system shown in FIG. 7. In the figure, the curve G shows the bit error rate characteristic when there is no interference, while the curve H shows the bit error rate characteristic under nonlinear interference. In this example, the points 81 and 82 on the curve H are points where the bit error rate is $1 \times 10^{-2}$ as an example.

Here, the intercept point input level IIP3 of the receiving side as a whole in interfered wireless communication can be estimated from the following equation (33) from the normalized received signal level $I_{11}$ at a bit error rate of $10^{-2}$ as an example at the received level region where the nonlinear interference is dominant and the measured value $P_{r1}$ at the bit error rate $10^{-2}$.

$$IIP3 = P_{r1}/I_{i1} \qquad (33)$$

However, the following conditions must be satisfied:

1) The bit error rate $10^{-2}$ near the line connecting the points 81 and 82 be a region where there is no effect from the received noise power, there is a level difference, and nonlinear interference is dominant.

2) The bit error rate $10^{-2}$ near the line connecting the points 81 and 82 be a region where there is no effect of the leakage power from the interference wave, the error rate of the curve G is sufficiently low, and nonlinear interference is dominant.

Third Embodiment

In the present embodiment, the variable attenuator 13 and interfering modulated signal generator 14 shown in FIG. 1 or FIG. 7 are adjusted or the receiving side variable attenuator 21 is adjusted to lower the input level of the receiving means while maintaining the D/U constant so as to estimate the reception thermal noise characteristic.

Figure 9:
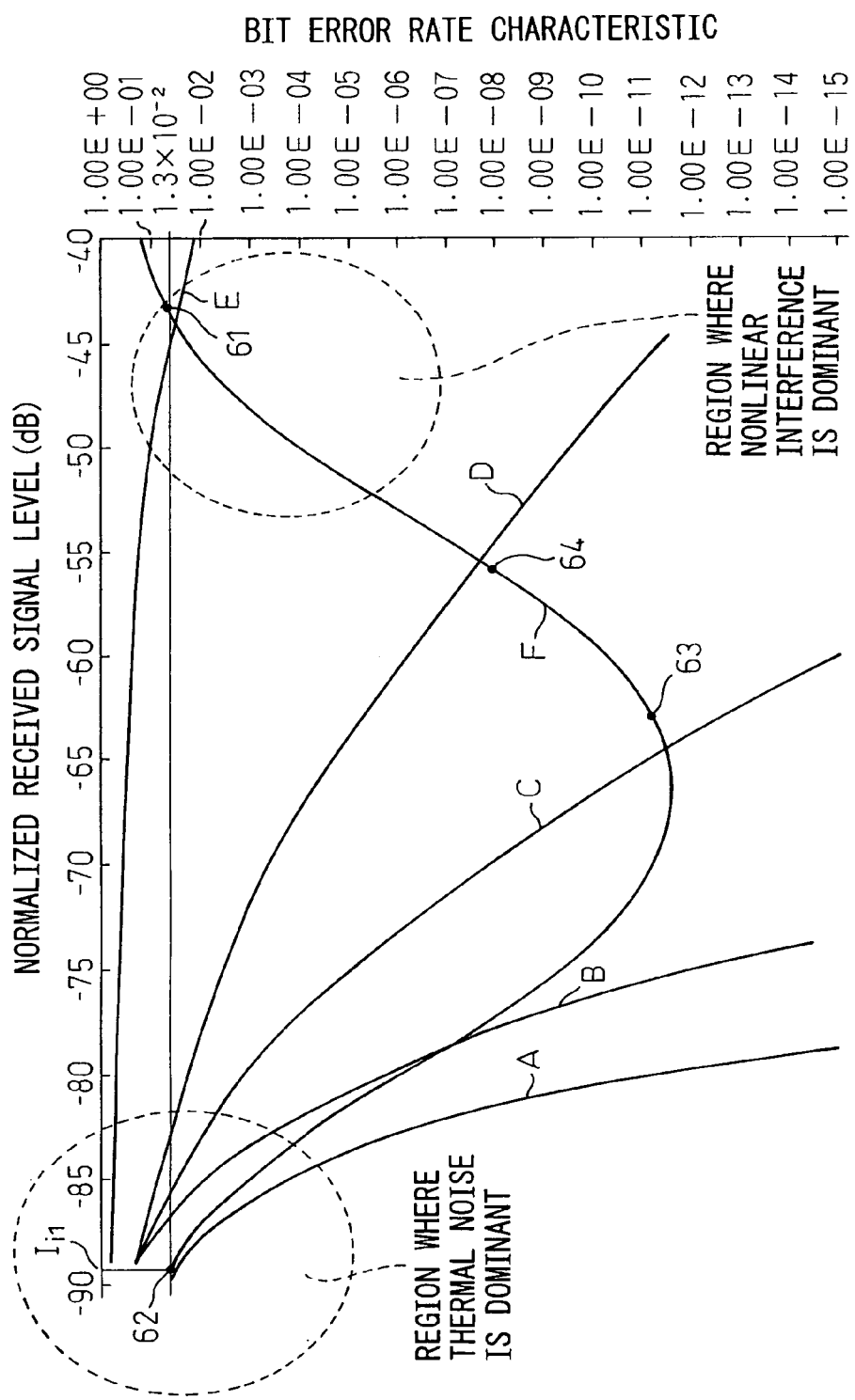
FIG. 9 is a view of a thermal noise characteristic under nonlinear interference measured by using an interference wave power as a parameter.
Figure 10:
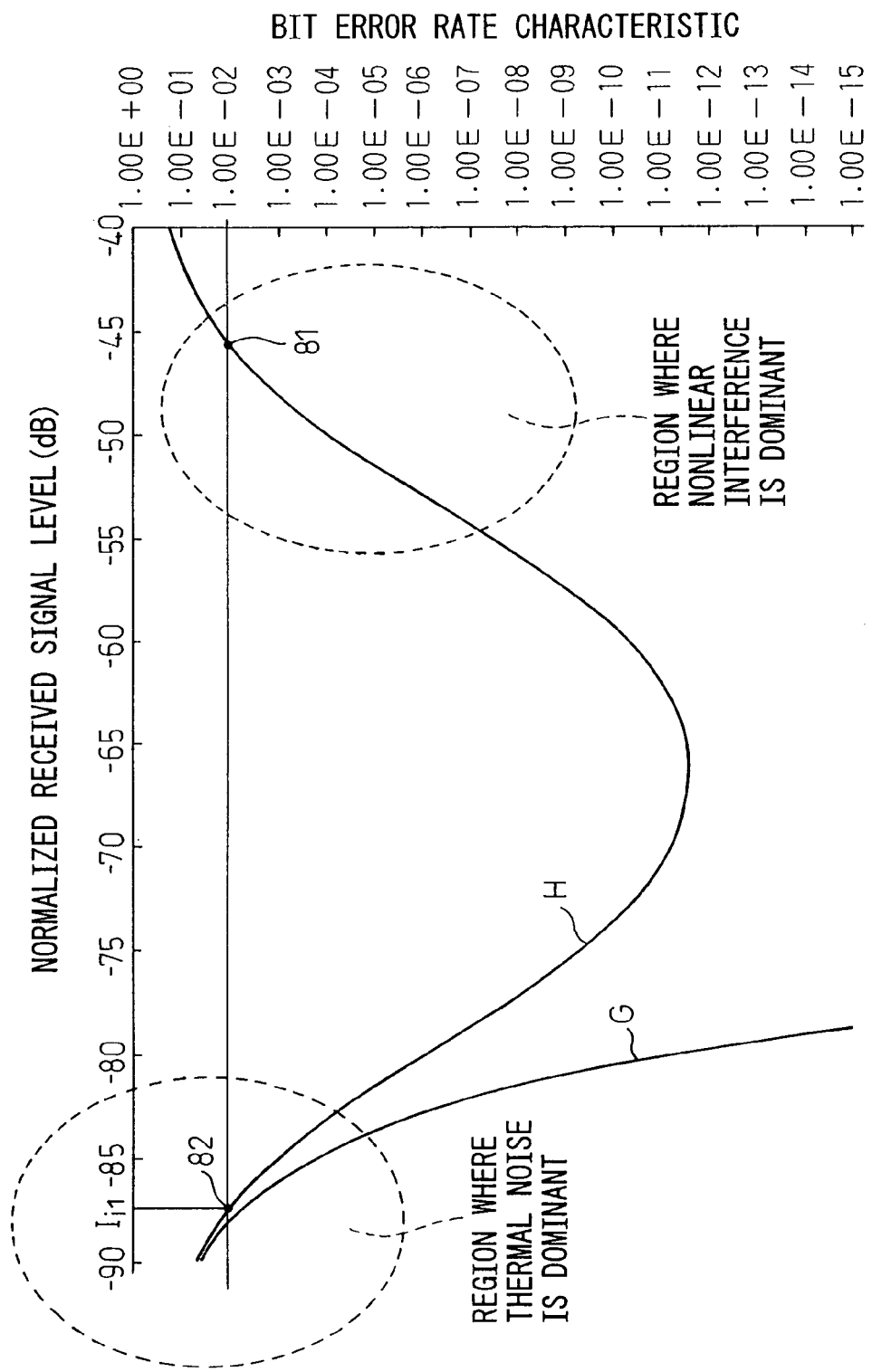
FIG. 10 is a view of a thermal noise characteristic under nonlinear interference measured by using an interference wave power as a parameter.

FIG. 9 and FIG. 10 are views of the thermal noise characteristic under nonlinear interference measured using the interference wave power as a parameter. FIG. 9 and FIG. 10 are graphs substantially the same as FIG. 6 and FIG. 10, the received level is lowered and the receiver thermal noise is estimated from the received level of the region where thermal noise is dominant where an increase in the bit error rate due to the receiver thermal noise would become a problem.

Explaining this using FIG. 10 as an example, the measured reception thermal noise (Pn (unit: $dB_m$)) is estimated as follows based on the normalized received level $I_{10}$ (dB) (not shown) determined from the received noise power, the level of the normalized received level $I_{11}$ (dB) determined under nonlinear interference at the point 82 where the line of the bit error rate $10^{-2}$ of an example of the bit error rate at the received level region where the nonlinear interference is dominant intersects the curve H in the region of a low receiving level where the thermal noise would interfere with the inherent received signal, and the level difference showing the same bit error rate tested at a line quality test system:

$$P_a - (I_{i1} + IIP3) - \Delta - D \qquad (34)$$

Here, $\Delta$ is the difference ($\Delta = P_B - P_A$) between the measured received level $P_A$ giving the bit error rate $10^{-2}$ and the measured received level $P_A$ giving the bit error rate $10^{-2}$ at the curve G when there is no interference, while D is the fixed deterioration showing the difference between the received level and theoretical value when the bit error rate characteristic $10^{-2}$ at the curve G when there is no interference.

Fourth Embodiment

Figure 11:
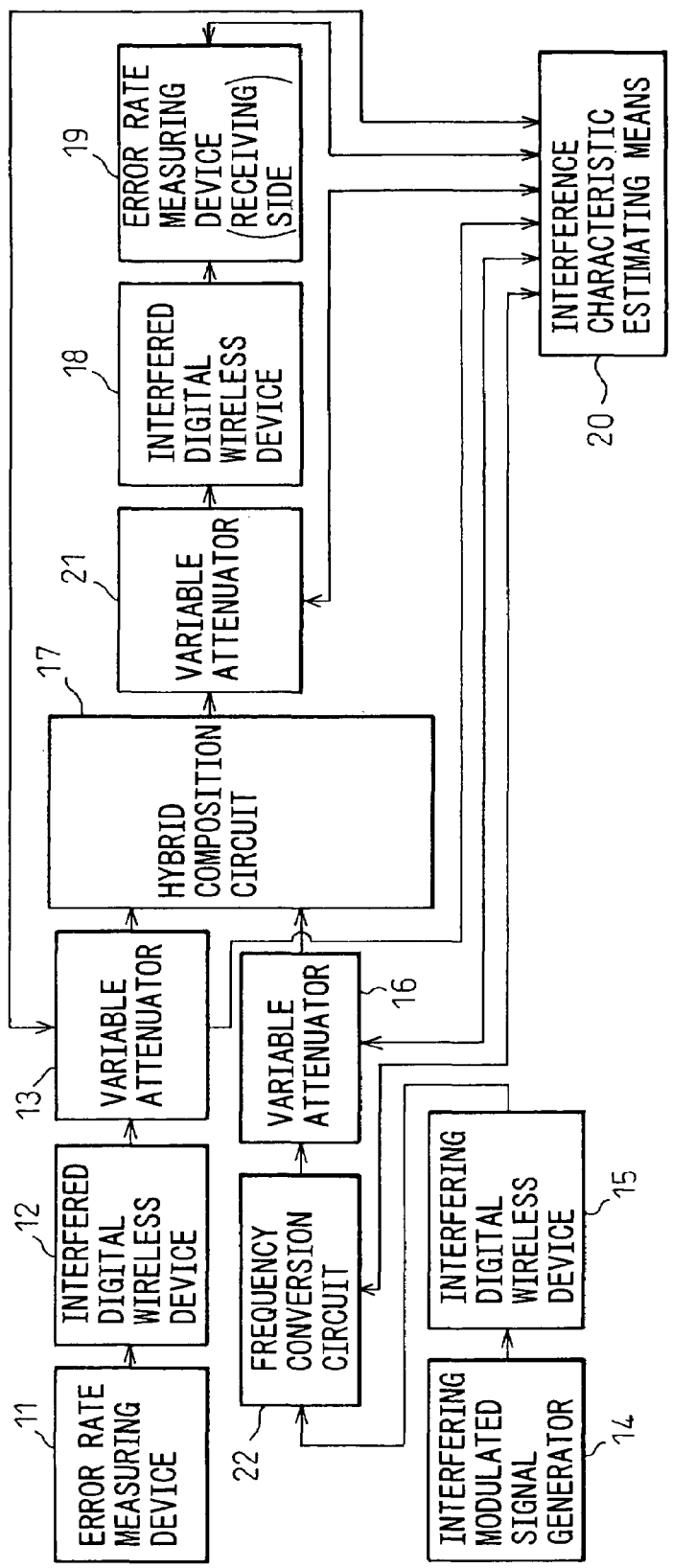
FIG. 11 is a block diagram of the configuration of an interference measurement and evaluation system according to a third embodiment of the present invention.

FIG. 11 is a block diagram of the configuration of an interference measurement and evaluation system according to a third embodiment of the present invention. In the figure, the difference from FIG. 7 is that a frequency conversion circuit 22 for changing the frequency of the interference wave is connected between the interfering digital wireless equipment 15 in the nonlinear interfering means and hybrid composition circuit 17. This frequency conversion circuit 22 is comprised by a mixer circuit, a frequency shift local oscillator, a splice signal removing band pass filter, etc.

The frequency conversion circuit 22 can change the generated frequency of the frequency shift local oscillator.

In the present embodiment, the carrier frequency of the interference wave is changed so as to estimate the reception equivalent band limitation of the receiving side as a whole from the receiving side input level versus reception error rate characteristic of the modulated wave signal.

Figure 12:
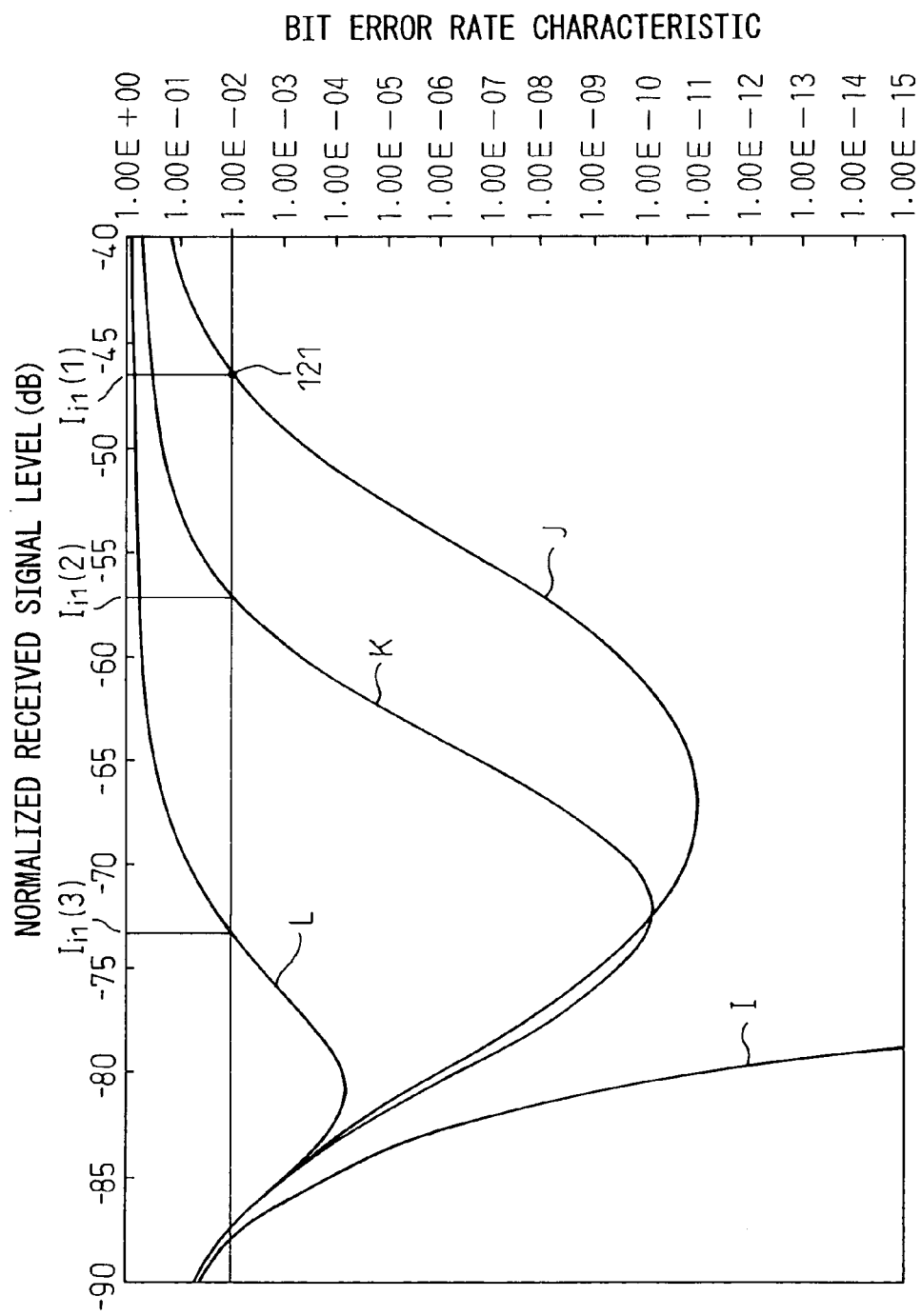
FIG. 12 is a graph of an example of estimation of an equivalent attenuation of power of a receiving side when changing the frequency interval of an interference signal and interfered wave under nonlinear interference measured by using the interference measurement and evaluation system shown in FIG. 11.

FIG. 12 is a graph of an example of the bit error rate characteristic under nonlinear interference measured using the interference measurement and evaluation system shown in FIG. 11. In the figure, curve I shows the bit error rate characteristic when there is no interference, curve J shows the bit error rate characteristic under nonlinear interference when the carrier frequency of the interfering digital wireless equipment, and the curve L shows the bit error rate characteristic under nonlinear interference when the carrier frequency of the interfering digital wireless equipment causes more attenuation at the initial band pass characteristic of the interfered digital wireless equipment.

The IIP3 of the receiving side of the interfered wireless communication device is found by the following equation (35) from the received level $I_{11}(1)$ at the bit error rate $10^{-2}$ as an example of the bit error rate near the received level region where nonlinear interference is dominant when the carrier frequency of the interfering digital wireless equipment does not cause attenuation at the graph J showing the initial band pass characteristic of the interfered digital wireless equipment and the measured value $P_{r1}$ of the power at the bit error rate $10^{-2}$.

$$IIP3 = P_{r1}/I_{i1} \tag{35}$$

However, the following conditions must be satisfied:

1) The receiving region of a bit error rate of $10^{-2}$ be a region where there is no effect from the received noise power, there is a level difference, and nonlinear interference is dominant.

2) The receiving region of a bit error rate of $10^{-2}$ be a region where there is no effect of the leakage power from the interference wave, the error rate of the curve J is sufficiently low, and nonlinear interference is dominant.

Regarding the attenuation with respect to the carrier frequency of any interfering digital wireless equipment, if the frequency interval between the center frequency of the interfered digital wireless equipment and center frequency of the interfering digital wireless equipment is made $\Delta f(2)$ for the curve K and is made $\Delta I(3)$ for the curve L, the equivalent attenuation at the initial band pass characteristic may be found from the following equations (36) and (37) from the normalized interfering levels $I_{11}(2)$ and $I_{11}(3)$ at the bit error rate $10^{-2}$:

$$L(2) = I_{11}(1) - I_{12}(2) \tag{36}$$

$$L(3) = I_{11}(1) - I_{12}(3) \tag{37}$$

Fifth Embodiment

In this embodiment, the interference measurement and evaluation system shown in FIG. 1 is used to estimate the reception equivalent leakage power which the interference wave of the receiving side as a whole has on the receiving side or interference reduction factor from the receiving side input level versus receiving error rate characteristic of the modulated carrier signal.

Figure 13:
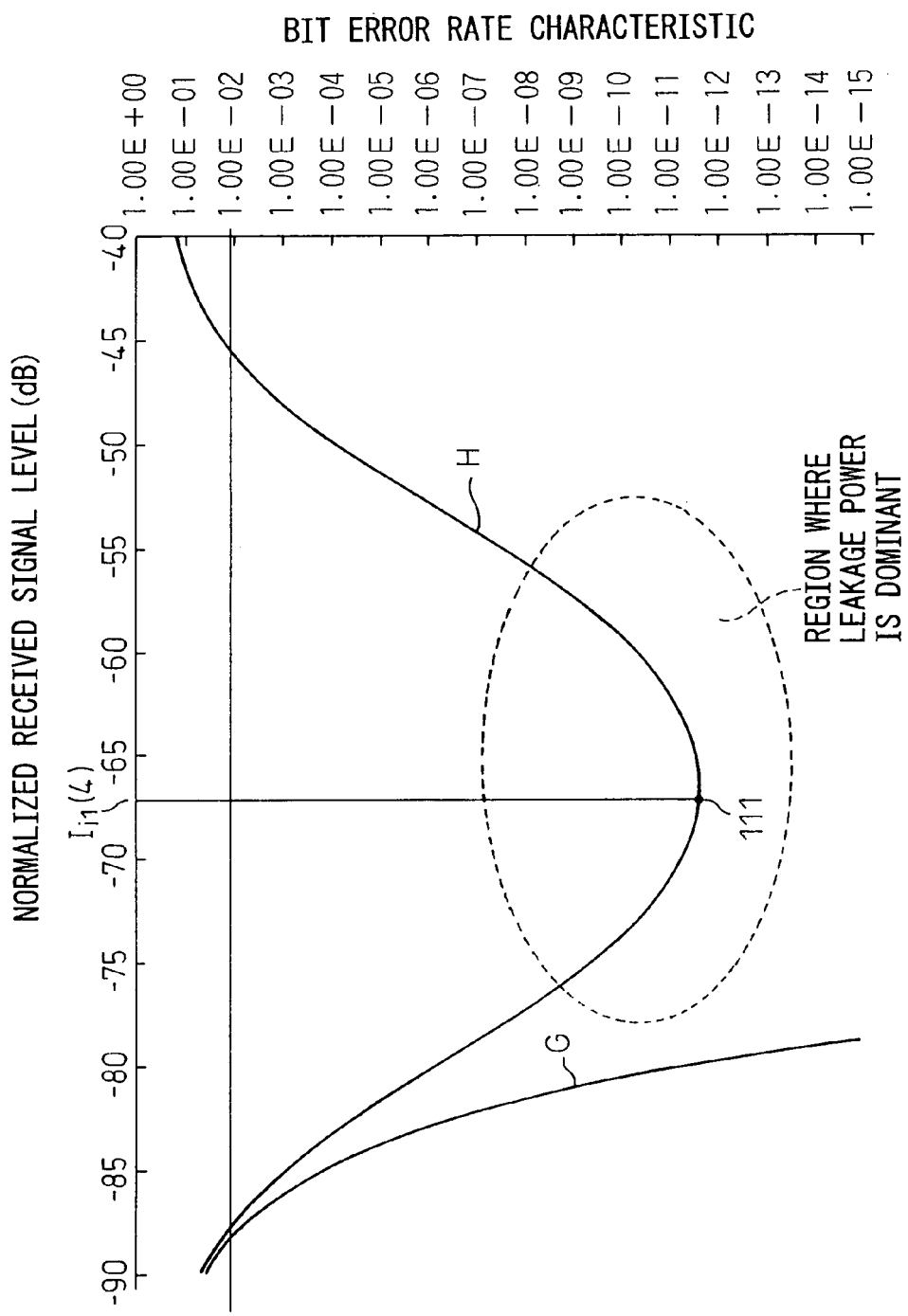
FIG. 13 is a graph of an example of estimation of an equivalent leakage power of a receiving side under nonlinear interference measured by using an interference measurement and evaluation system shown in FIG. 1.

FIG. 13 is a graph expressing the equation of the bit error rate characteristic under nonlinear interference measured using the interference measurement and evaluation system shown in FIG. 1 by the D/U (truth value) and showing an example of the bit error rate characteristic under nonlinear interference. A curve substantially the same as FIG. 10 is drawn.

In FIG. 13, the curve G shows the bit error rate characteristic when there is no interference, while the curve H shows the bit error rate characteristic when the D/U under nonlinear interference is constant. The point 111 on the curve H is the point where the bit error rate characteristic shows the best value. The normalized received signal level is $I_{11}(4)$.

If setting $$(D/U) = I_{11}/I_{12} \tag{38}$$

$$\eta = 20 \times \log|1 - I_{i2} - 2 \cdot I_{11}/(D/U)| \tag{39}$$

Further $$i\ C/I3 - 20 \times \log|\{1 - I_{11} - 2 \cdot I_{11}/(D/U)\}/\{I_{11}/(D/U)\}| - 3\ dB \tag{40}$$

As an example, as a delay detection type simplified error rate characteristic, $$BER - 1/2 \times \exp(-\rho/2) \tag{41}$$

$$Ln(2 \times BER) = -\rho/2 \tag{42}$$

Here, if the signal-to-noise power ratio is $\rho$, $\rho$ become as in the following equation:

$$\rho = 1/\{1/(\eta \cdot \delta \cdot C/P_N) + 1/(\eta \cdot \delta \cdot C/I_{ACF}) + 1/(\eta \cdot \delta \cdot C/I_3)\} \tag{43}$$

Here, if the leakage power IACP is expressed by the ratio (IRF) between the leakage power of the interference wave and the initial band pass level of the adjacent interfered digital wireless equipment, $$\rho = 1/\{1/(\eta \cdot \delta \cdot C/P_N) + 1/(\eta \cdot \delta \cdot C/IIP3/IRF/I_{12}) + 1/(\eta \cdot \delta \cdot C/I_3)\} \tag{44}$$

If the normalized interfered wave level at the best value of the bit error rate when making D/U constant is $I_{11}$, using equation (38):

$$\rho = 1/[1/(\eta \cdot \delta \cdot C/P_N) + 1/\{\eta \cdot (\delta \cdot D/U)/IRF\} + 1/\{\eta \cdot \delta \cdot C/I_3\}] \tag{45}$$

From equation (42) and equation (45), $$-1/2/Ln(2 \times BER) = 1/(\eta \cdot \delta \cdot C/P_N) + 1/\{\eta \cdot \delta \cdot (D/U)/IRF\} + 1/\{\eta \cdot \delta \cdot C/I_3\}] \tag{46}$$

From equation (46), $$IRF = \{\eta \cdot \delta \cdot (D/U) \times [-1/2/Ln(2 \times BER) - 1/(\eta \cdot \delta \cdot C/P_N) - 1/\{\eta \cdot \delta \cdot C/I_3\}]\} \tag{47}$$

The leakage power ratio IRF is found using the above equations (38), (40), and (47) from the received signal level $I_{i1}$ of the normalized interfered signal at the best value of the bit error rate when making D/U constant and the noise power ($P_N$) of the interfered digital wireless equipment.

Here, Ln( ) indicates the natural log (bottom "R").

However, the point 111 showing the best bit error rate is the region where there is no effect from the nonlinear interference and received noise power on the curve H of the constant D/U ratio, there is a level difference, and the leakage power is dominant.

Sixth Embodiment

In this embodiment, an error rate characteristic test system for measuring the wireless communication line error rate under interference of the fifth embodiment is used to estimate the receiving side reception equivalent leakage power or interference reduction factor for the offset frequency of the interference wave and the interference wave.

Figure 14:
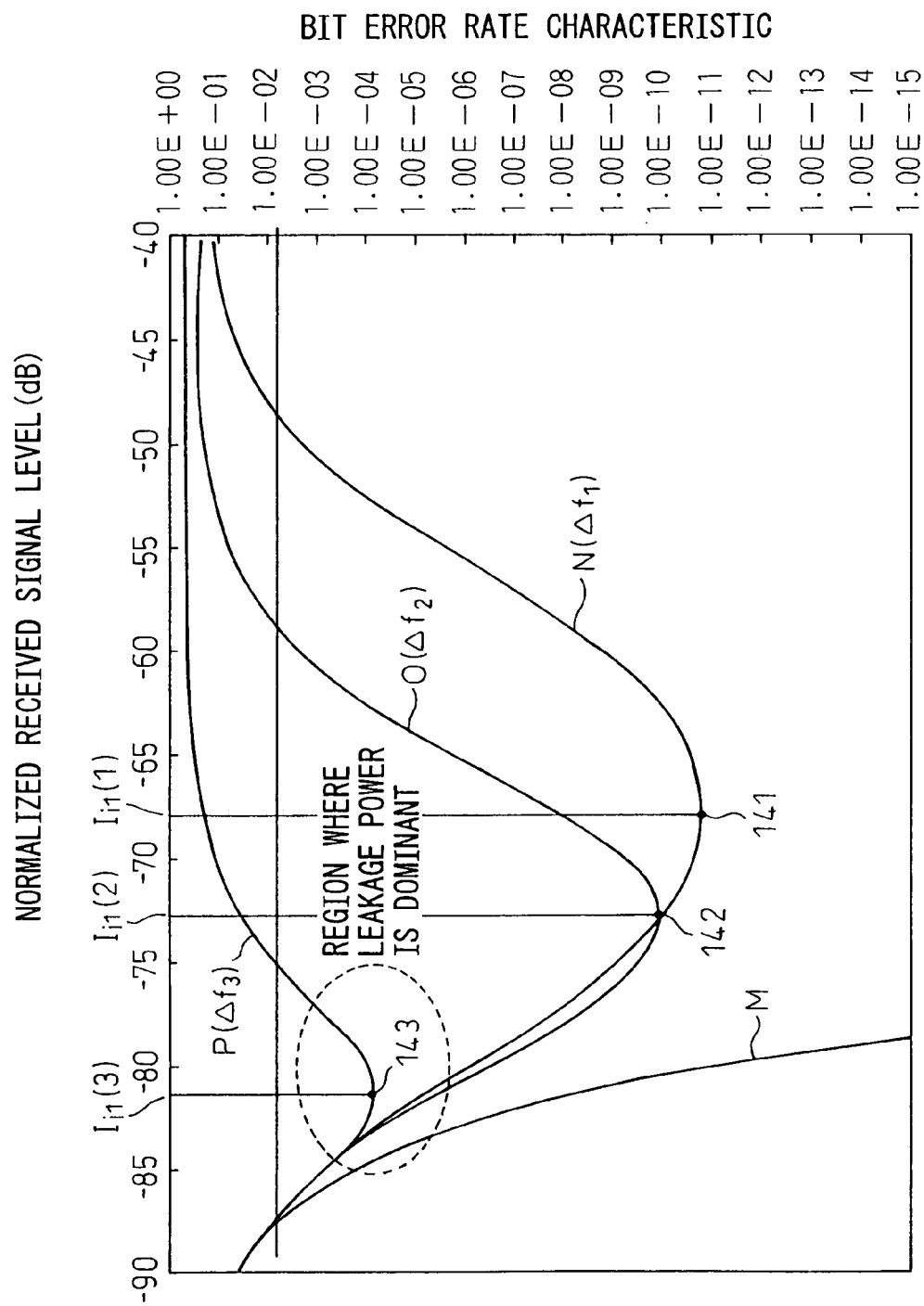
FIG. 14 is a graph of the bit error rate characteristic under nonlinear interference measured by using the test system shown in FIG. 7.

FIG. 14 is a graph expressing the equation of the bit error rate characteristic under nonlinear interference measured using the test system shown in FIG. 7 by the D/U (truth value) and showing an example of the bit error rate characteristic under nonlinear interference corresponding to the frequency difference of the interference signal and interfered signal (offset frequency $\Delta f_1$).

FIG. 14, the curve M shows the bit error rate characteristic when there is no interference, while the curve N shows the bit error rate characteristic when the D/U under nonlinear interference is constant. The point 111 on the curve H is the point where the bit error rate characteristic shows the best value. The normalized received signal level is $I_{11}(4)$.

The normalized interfered wave received signal level of the best value of the bit error rate at the time of making the D/U constant for the offset frequency $\Delta f_1$ of the interference wave is $I_{11}(\Delta f_1)$ and the noise power of the interfered digital wireless equipment is ($P_N$), so IRF ($\Delta f_1$) is found from equation (47) using equations (38), (39) and (40). In this case, the effect of the leakage power is relatively small.

Further, the curve O in FIG. 14 shows the bit error rate characteristic under nonlinear interference when the offset frequency of the interference wave is $\Delta f_2$ smaller than $\Delta f_1$. The point 142 is the point where the bit error rate characteristic in that case is the best value. The normalized received signal level is $I_{11}(2)$. The leakage power ratio IRF ($\Delta f_2$) becomes larger than IRF ($\Delta f_1$).

In this case as well, the leakage power ratio IRF ($\Delta f_2$) is found in the same way as above. IRF ($\Delta f_2$) becomes larger than IRF ($\Delta F_1$).

Further, the curve P in FIG. 14 shows the bit error rate characteristic under nonlinear interference at the offset frequency $\Delta f_3$ smaller than $\Delta f_2$, of the interference wave. The point 143 is the point of the best value of the bit error rate characteristic. The normalized received signal level is $I_{11}(3)$.

In this case as well, the leakage power ratio IRF ($\Delta f_2$) is found in the same way as above. IRF ($\Delta f_3$) becomes larger than IRF ($\Delta f_2$).

However, the points 141, 142, and 143 showing the best bit error rate preferably are regions where the leakage power of a level difference of no effect from the nonlinear interference and received noise power on the curves N, O, and P where the D/U ratio is made constant is dominant.

Seventh Embodiment

In the present embodiment, in the same way as in the sixth embodiment, the reception equivalent leakage power of the receiving side is estimated for the offset frequency of the modulation wave signal and interference signal, but when the received signal level measurement is discrete, IIP3 and $P_n$ are given, but the receiving side input level versus received error rate characteristic for the D/U is only obtained discretely, but in this case as well, it is possible to approximate the input level at the best value of the receiving side input level versus reception error rate characteristic and estimate the reception equivalent leakage power or the interference reduction factor.

From equation (47), $$-1/2/Ln(2\times BER)=1/(\eta\cdot\delta\cdot C/P_N)+1/\{\eta\cdot\delta\cdot(D/U)/IRF\}+1/\{\eta\cdot\delta\cdot C/I_3\} \quad (48)$$

Here, $$(D/U)=I_{11}/I_{12} \quad (49)$$

$$\eta=[1\ I_{li2}\cdot I_{11}/(D/U)]^2 \quad (50)$$

$$C/I3-1/2\times[1-I_{i1}-2\cdot I_{i1}{}^3/(D/U)^2]^2 \quad (51)$$

If designating the receiving side input level when measuring the bit error rate characteristic $I_{11}(1), I_{11}(2), \ldots I_{11}(n)$ and the bit error rate at those times $ber(1), ber(1), \ldots ber(n)$ and using polynomial interpolation as an example of approximation, $$BER(r)=ber(1)\times L_1(r)+ber(1)\times L_2(r)+\ldots ber(1)\times L_n \quad (52)$$
(L)

Here, $$L_i(r)=\frac{(r-r_1)\cdots(r-r_{1-1})(r-r_{1-1})\cdots(r-r_n)}{(r_1-r_1)\cdots(r_i\cdot r_{1-1})(r_1\ r_{1-1})\cdots(r_1-r_n)}$$

$$r_1=I_{il}(k)$$

If differentiating the bit error rate by "$\gamma$" when D/U is constant, the minimum value is $$0-\frac{d}{dr}d[ber(1)\times L_1(r)+ber(1)\times L_2(x)i\cdots ber(1)\times L_n(r)]$$

From the above, "$\gamma$" is found, BER(r) is found from equation (52), and IRF is found by entering equation (50) and equation (51) into equation (48).

The present embodiment can also be realized by the interference evaluation system shown in FIG. 11. In FIG. 11, the interference evaluating means 20 collects information from the variable attenuators 13, 16, and 21 and the frequency conversion circuit 22, enters the bit error rate of the error rate measuring device 19 as data, and uses the algorithm shown in the present embodiment to specify the input level of the best value for the discrete offset frequency and estimate the reception equivalent leakage power or interference reduction factor.

Eighth Embodiment

In the present embodiment, it is made possible to estimate the line quality characteristics of a receiving means for the level or offset frequency of the interference signal of any signal using the nonlinear interference theoretical value or theoretical curve.

That is, a means is provided for enabling estimation of the nonlinear interference characteristic from the region where the nonlinear interference is dominant for any offset frequency, estimation of the reception thermal noise from the IIP3 as the reception performance and region where the reception thermal noise is dominant, estimation of the interference reduction factor of the interference signal from the reception thermal noise as the reception performance and the region where the adjacent power is dominant, and estimation of the bit error rate under nonlinear interference for any offset frequency signal and input power level of the interference signal from the known interference reduction factor using equations (7) and (14) and using equations (16) to (18) expressing the delay detection type simplified error rate, equations (19) and (20) expressing the QPSK delay detection type error rate, equations (22) and (23) expressing the QPSK absolute synchronous detection error rate, or double the bit error rate characteristic of equations (22) and (23) for the bit error rate characteristic of the QPSK differential synchronous detection error rate characteristic.

Ninth Embodiment

In the present embodiment, even if the measured values of the receiving side input level and reception line quality characteristic linked with the nonlinear interference theoretical curve are discrete, it is possible is estimate the nonlinear interference characteristic for any offset frequency, automatically estimate the adjacent leakage power etc., and estimate the line quality characteristic.

If the receiving side input level when measuring the bit error rate characteristic is $C_1, C_2, \ldots C_n$ and the thermal noise of the reception system is Pn, the bit error rates at that time are $ber_1, ber_2, \ldots ber_n$, so using polynomial interpolation as an example of approximation:

$$BER(r) = ber_1 \times L_1(r) + ber_2 \times L_2(r) + \ldots ber_n \times L_n(r) \qquad (53)$$

Here, $$L_i(r) = \frac{(r-r_1)\cdots(r-r_{i-1})(r-r_{i-1})\cdots(r-r_n)}{(r_i-r_1)\cdots(r_i-r_{i-1})(r_i-r_{i-2})\cdots(r_i-r_n)}$$

$$r_1 = C_1/P_n$$

In general, using equation (17) and equation (18), $$\rho \sim A^2/2/50/\sigma^2 \qquad (54)$$

$\delta^2$: noise power

If the received power of the frequency $f_{c1}$ is C, the sensitivity suppression factor is $\eta$, and $\delta$ is the fixed parameter, $\rho$ becomes the following equation:

$$\rho \sim 1/\{1/(\eta \cdot \delta \cdot C/P_N) + 1/(\eta \cdot \delta \cdot C/I_{ACP}) + 1/(\eta \cdot \delta \cdot C/I3)\} \qquad (55)$$

10th Embodiment

In this embodiment, the nonlinear interference characteristic of the receiving side as a whole is estimated based on the receiving side input level versus reception line quality characteristic of the modulated carrier signal and the received levels at the region where the adjacent power is dominant and the region where the received thermal noise is dominant.

Figure 15:
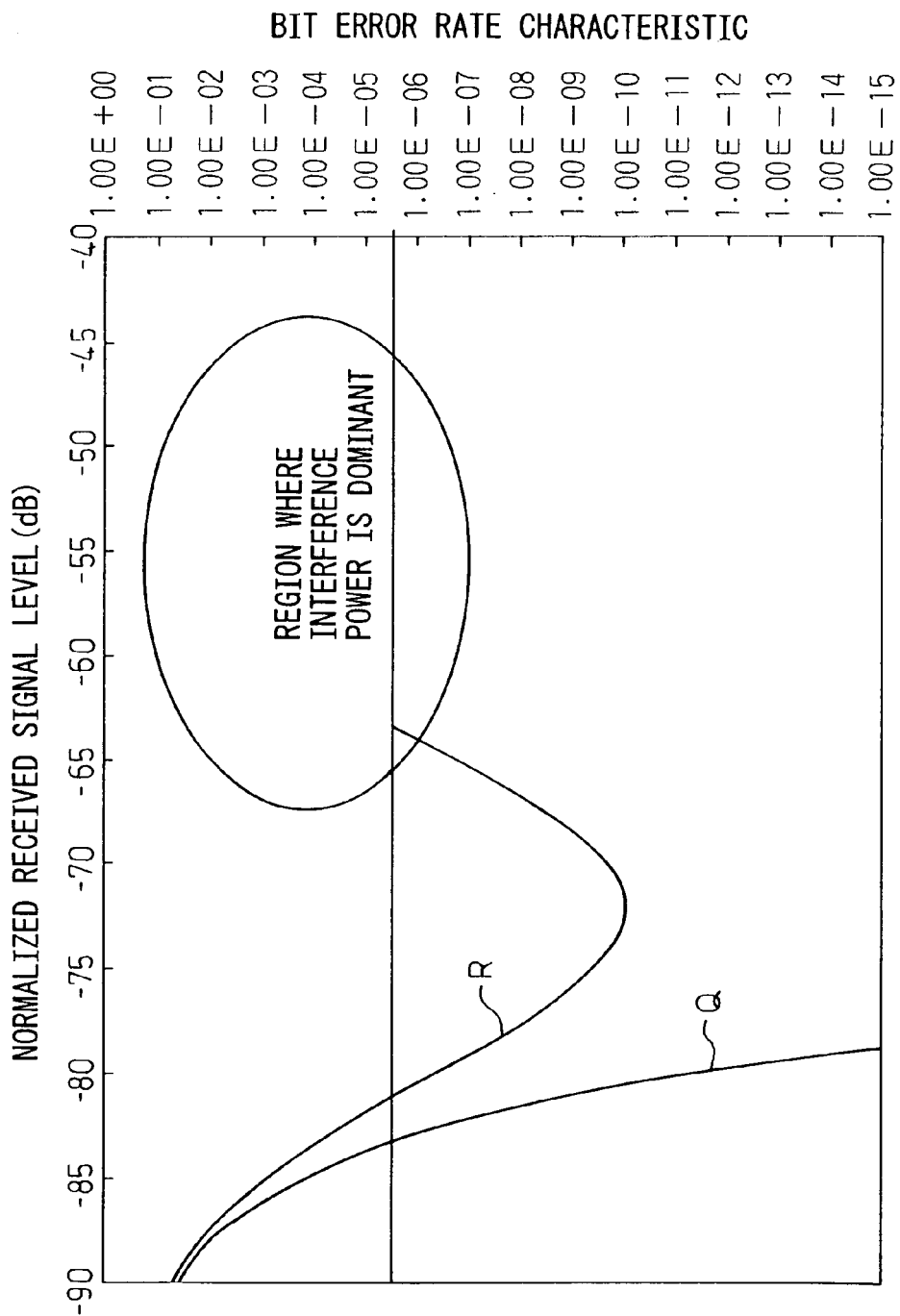
FIG. 15 is a graph of the bit error rate characteristic under nonlinear interference in a 10th embodiment of the present invention.

FIG. 15 is a graph of the bit error rate characteristic under nonlinear interference in a 10th embodiment. In the figure, the curve Q shows the bit error rate characteristic when there is no interference, while the curve R shows the bit error rate characteristic when making the interference power larger. As shown in the figure, in this case, data is not obtained in the region where the interference power is dominant. In this embodiment, the nonlinear interference characteristic of this unknown region is estimated by the following technique.

From equation (56), $$-1/2/Ln(2 \times BER) = 1/(\eta \cdot \delta \cdot C/P_N) + 1/(\eta \cdot \delta \cdot (D/U)/IRF) + 1/(\eta \cdot \delta \cdot C/I_3) \qquad (56)$$

Here, $$(D/U) = T_{11}/T_{12} \qquad (57)$$

$$\eta = [1 - I_{12} - 2 \cdot I_{11}/(D/U)]^2 \qquad (58)$$

$$C/I_3 = 1/2 \times [1 - I_{11} - 2 \cdot T_{11}^2/(D/U)^2]^2 \qquad (59)$$

When D/U is constant and C/PN and D/U/IRF are known, equation (56) is found from equation (60)

$$-1/2/Ln(2 \times BER) = 1/\eta \times \delta_x (C/P_N) + 1/(\eta \times \delta_x (D/U)/IRF) + 1/[(\eta \times \delta_x \times (C/I_3)] \qquad (60)$$

From the equation (60), equation (58), and equation (59), the reception signal level $I_{11}$ is determined.

If considering the fact that this is not a nonlinear region, $\eta$ is set as "1" and equation (60) becomes as follows using equation (59):

$$C/I_3 = \cfrac{1}{-\cfrac{1}{2 \cdot \mathrm{Ln}(2 \times BER)} - \cfrac{1}{(\delta \cdot C/P_n)} - \cfrac{1}{(\delta \cdot D/U) \cdot IRF}} \qquad (61)$$

$$\frac{1}{2} \cdot [1 - T_{iI} - 2 \cdot I i_1^2/(b/V)^2]^2 = \cfrac{1}{-\cfrac{1}{2 \cdot \mathrm{Ln}(2 \times BER)} - \cfrac{1}{(\delta \cdot C/P_n)} - \cfrac{1}{(\delta \cdot D/U) \cdot TRF}} \qquad (62)$$

$$[1 - I_{iI} - 2 \cdot I_{iI}2/(D/U)^2] = \sqrt{-\cfrac{2}{-\cfrac{1}{2 \cdot \mathrm{Ln}(2 \times BER)} - \cfrac{1}{(\delta \cdot C/P_n)} - \cfrac{1}{(\delta \cdot D/U) \cdot IRF}}} \qquad (63)$$

$$I_{iI} = \cfrac{-1 + \sqrt{1 + 8/(D/U)^2 \times \left[1 - \sqrt{\cfrac{2}{-\cfrac{1}{2 \cdot \mathrm{Ln}(2 \times BER)} - \cfrac{1}{(\delta \cdot C/P_N)} - \cfrac{1}{(\delta \cdot D/U) \cdot IRF}}}\right]}}{\{4/(D/U)^2\}} \qquad (64)$$

If making the measured value Pr, IIP becomes $$IIP3 = P_N/Ti1 \qquad (65)$$

Summarizing the effects of the invention, as clear from the above explanation, according to the present invention, since an interference measurement and evaluation system using a nonlinear interference theoretical curve linked with a received line quality characteristic so as to estimate the reception characteristics under nonlinear interference, estimate the reception thermal noise characteristic, estimate the ratio between the third-order distortion coefficient $a_3$ and first-order distortion characteristic due to nonlinear interference or third-order intermodulation (IIP3), estimate the reception pass band characteristic, and estimate the leakage power from an adjacent channel is provided, it becomes possible to take measures against deterioration of the line quality due to nonlinear interference.

While the invention has been described with reference to specific embodiments chosen for purpose of illustration, it should be apparent that numerous modifications could be made thereto by those skilled in the art without departing from the basic concept and scope of the invention.

What is claimed is:

1. An interference measurement and evaluation system comprised of:
   a transmitting means for transmitting a digitally modulated wave signal, a receiving means for decoding a modulated signal from a modulated wave signal received from the transmitting means, and an interference characteristic estimating means for estimating an interference characteristic including a nonlinear interference characteristic by which said received modulated wave signal is affected from an interference signal with respect to said received modulated wave signal due to the nonlinear characteristic of said receiving means, said interference characteristic estimating means referring to a level of said modulated wave signal received by said receiving means, a level of said interference signal, and a nonlinear interference theoretical curve given in relation to a line quality of a modulated signal decoded by said receiving means and estimating an interference characteristic including the nonlinear characteristic possessed by said receiving means, based on the measured level of the modulated wave signal, level of said interference signal, and line quality of said decoded modulated signal.

2. An interference measurement and evaluation system as set forth in claim 1, wherein said interference characteristic estimating means estimates the nonlinear interference characteristic possessed by said receiving based on the modulated wave signal of a region where the nonlinear interference is dominant when said nonlinear interference theoretical curve satisfies a predetermined line quality and based on the received level of the interference signal.

3. An interference measurement and evaluation system as set forth in claim 2, wherein said receiving means is provided with a receiving side interfered digital wireless means receiving a composite signal of said modulated wave signal from said transmitting means and an interference signal from a nonlinear interfering means and an error rate measuring means for measuring an error rate in said composite signal and wherein said predetermined line quality is a bit error rate free from an effect from a received noise power, free from an effect of leakage power, dominated by the nonlinear interference region, and measured by said error rate measuring means.

4. An interference measurement and evaluation system as set forth in claim 2 or 3, wherein said transmitting means is provided with a transmitting side variable attenuating means for changing said transmitted signal level and said nonlinear interference characteristic possessed by said receiving means is estimated by changing said transmitted signal level by said transmitting side variable attenuating means.

5. An interference measurement and evaluation system as set forth in claim 3, wherein said transmitting means and said receiving means are provided between them with a nonlinear interfering means having a carrier frequency different from a frequency region of said transmitting means and giving a nonlinear interference wave signal having a non negligible level compared with the level of said modulated carrier transmitted from said transmitting means, said transmitting means is provided with a transmitting side variable attenuating means for changing said interference signal level, and said nonlinear interfering means is provided with an interfering side variable attenuating means for changing the level of said interference signal, and said transmitting side variable attenuating means and said interfering side variable attenuating means are adjusted to make the ratio of said transmitting signal level and the level of said interference signal constant and give it to said receiving side interfered digital wireless means, whereby said nonlinear characteristic possessed by said receiving means is estimated.

6. An interference measurement and evaluation system as set forth in claim 5, wherein said receiving means is provided with a receiving side variable attenuator for changing an input signal level from said transmitting means and changes said input signal level so as to estimate said nonlinear interference characteristic possessed by said receiving means.

7. An interference measurement and evaluation system as set forth in claim 5, wherein said nonlinear interfering means is provided with a frequency converting means for converting a center frequency of a nonlinear interference wave, and said interference characteristic estimating means estimates a received equivalent band limitation characteristic possessed by said receiving means when converting the center frequency of the nonlinear interference wave by said frequency converting means.

8. An interference measurement and evaluation system as set forth in claim 1, wherein said interference characteristic estimating means estimates a thermal noise power based on the nonlinear characteristic given to said receiving means based on a received signal level of a region where the received thermal noise power is dominant when said nonlinear interference theoretical curve satisfies a predetermined line quality.

9. An interference measurement and evaluation system as set forth in claim 8, wherein said interference characteristic estimating means estimates the nonlinear interference characteristic of said receiving means based on said nonlinear interference theoretical curve and said estimated thermal noise power even when said modulated wave signal and said interference signal approach each other in frequency to an extent where the adjacent power increases.

10. An interference measurement and evaluation system as set forth in claim 1, wherein said interference characteristic estimating means estimates a leakage power of said receiving means based on a received signal level of a region where leakage power is dominant when said nonlinear interference theoretical curve satisfies a best line quality.

11. An interference measurement and evaluation system as set forth in claim 10, wherein said interference characteristic measuring means is provided with a frequency converting means for converting a center frequency of an interference signal, and said interference characteristic estimating means finds a receiving side input level giving the best line quality characteristic and its line quality based on a receiving side input level receiving line quality characteristic of said modulated wave signal for an offset frequency of said interference signal when converting the center frequency of the interference signal by said frequency converting means and said nonlinear interference theoretical curve and estimating the received equivalent leakage power for the offset frequency of the receiving side as a whole using this.

12. An interference measurement and evaluation system as set forth in claim 10, which, when measured values of a receiving side input level and the received line quality characteristic linked with said nonlinear interference theoretical curve are discrete, finds by approximation the receiving side input level giving the best line quality characteristic and that received line quality and estimates the received equivalent leakage power for the offset frequency of the receiving means by this.

13. An interference measurement and evaluation system as set forth in claim 10, wherein said interference characteristic estimating means estimates the line quality characteristic of said receiving means for an interference signal including a nonlinear interference wave of any frequency and of any level based on said nonlinear interference theoretical curve, a thermal noise power estimated given to said receiving means based on a received signal level of a region where the received thermal noise power is dominant when said nonlinear interference theoretical curve satisfies a predetermined line quality, and said equivalent leakage power.

14. An interference measurement and evaluation system as set forth in claim 1, wherein said interference characteristic estimating means estimates by approximation an interference characteristic including a nonlinear interference characteristic possessed by said receiving means based on a line quality of a decoded signal of a discrete receiving side input level versus modulated wave signal characteristic of a modulated wave signal measured over a range near said modulated wave signal from a state where there is no signal giving nonlinear interference to said receiving means to a state giving nonlinear interference.

15. An interference measurement and evaluation system as set forth in claim 1, wherein said interference characteristic estimating means estimates the nonlinear interference of said receiving means based on a received level of a region where an adjacent power dominates and of a region where a received thermal noise dominates in said nonlinear interference theoretical curve.

* * * * *

UNITED STATES PATENT AND TRADEMARK OFFICE
CERTIFICATE OF CORRECTION

| | |
|---|---|
| PATENT NO. | : 7,107,011 B2 |
| APPLICATION NO. | : 10/643077 |
| DATED | : September 12, 2006 |
| INVENTOR(S) | : Isao Nakazawa et al. |

It is certified that error appears in the above-identified patent and that said Letters Patent is hereby corrected as shown below:

Title Page item [75] Column 1 (Inventors Residence), Line 7, change "Koganei" to --Tokyo--.

Title Page Abstract Column 2 (Abstract), Line 4, change "communications" to --communication--.

Column 25, Line 27, after "receiving" insert --means--.

Signed and Sealed this

Tenth Day of April, 2007

JON W. DUDAS
*Director of the United States Patent and Trademark Office*